US008458217B1

(12) United States Patent  
McGrogan et al.

(10) Patent No.: US 8,458,217 B1
(45) Date of Patent: Jun. 4, 2013

(54) INSTANTLY BUILT INFORMATION SPACE (IBIS)

(75) Inventors: Stephen K. McGrogan, Pleasanton, CA (US); Kwang T. Ro, Dublin, CA (US); James M. Gido, Oakland, CA (US)

(73) Assignee: Advent Software, Inc., San Francisco, CA (US)

(*) Notice: Subject to any disclaimer, the term of this patent is extended or adjusted under 35 U.S.C. 154(b) by 423 days.

(21) Appl. No.: 12/546,205

(22) Filed: Aug. 24, 2009

(51) Int. Cl.
*G06F 17/30* (2006.01)

(52) U.S. Cl.
USPC ........................................................ 707/792

(58) Field of Classification Search
USPC ........................................................ 707/792
See application file for complete search history.

(56) References Cited

U.S. PATENT DOCUMENTS

| | | | |
|---|---|---|---|
| 4,805,134 A | 2/1989 | Calo et al. |
| 4,853,842 A | 8/1989 | Thatte et al. |
| 4,972,367 A | 11/1990 | Burke |
| 5,008,786 A | 4/1991 | Thatte |
| 5,010,478 A | 4/1991 | Deran |
| 5,043,885 A | 8/1991 | Robinson |
| 5,136,707 A | 8/1992 | Block et al. |
| 5,202,985 A | 4/1993 | Goyal |
| 5,237,661 A | 8/1993 | Kawamura et al. |
| 5,276,835 A | 1/1994 | Mohan et al. |
| 5,283,884 A | 2/1994 | Menon et al. |
| 5,283,894 A | 2/1994 | Deran |
| 5,305,389 A | 4/1994 | Palmer |
| 5,398,336 A | 3/1995 | Tantry et al. |
| 5,404,477 A | 4/1995 | Jippo |
| 5,408,653 A | 4/1995 | Josten et al. |
| 5,412,805 A | 5/1995 | Jordan, II et al. |
| 5,426,747 A | 6/1995 | Weinreb et al. |
| 5,428,761 A | 6/1995 | Herliy et al. |
| 5,434,992 A | 7/1995 | Mattson |
| 5,437,027 A | 7/1995 | Bannon et al. |
| 5,455,942 A | 10/1995 | Mohan et al. |
| 5,465,352 A | 11/1995 | Nakazawa et al. |
| 5,485,609 A | 1/1996 | Vitter et al. |
| 5,493,668 A | 2/1996 | Elko et al. |
| 5,499,367 A | 3/1996 | Bamford et al. |
| 5,506,984 A | 4/1996 | Miller |

(Continued)

OTHER PUBLICATIONS

Neeta Garimella, "Understanding and Exploiting Snapshot Technology for Data Protection, Part 1: Snapshot Technology Overview", IBM developerWorks blog, posted Apr. 26, 2006, pp. 1-7.*

(Continued)

*Primary Examiner* — Rehana Perveen
*Assistant Examiner* — Scott A Waldron
(74) *Attorney, Agent, or Firm* — Stephen C. Glazier; K&L Gates LLP

(57) ABSTRACT

A computer system for generating an Instantly Built Information Space (IBIS) for use with an application program is provided. The application program connects to a data repository. The application program connects to at least one Bookkeeping Information Space (BIS). The address of a main database object of the BIS is placed into a knowledge base pointer. The address of a main database object of the database is placed into a pointer in an object of the BIS. The database and the BIS are included in the IBIS. The BIS is accessed by the application program through the knowledge base pointer and the database is accessed by the application program through the pointer in the object of the BIS.

19 Claims, 14 Drawing Sheets

U.S. PATENT DOCUMENTS

| | | |
|---|---|---|
| 5,550,971 A | 8/1996 | Brunner et al. |
| 5,560,006 A | 9/1996 | Layden et al. |
| 5,561,795 A | 10/1996 | Sarkar |
| 5,574,902 A | 11/1996 | Josten et al. |
| 5,608,904 A | 3/1997 | Chaudhuri et al. |
| 5,611,076 A | 3/1997 | Durflinger et al. |
| 5,615,360 A | 3/1997 | Bezek et al. |
| 5,636,350 A | 6/1997 | Eick et al. |
| 5,649,139 A | 7/1997 | Weinreb et al. |
| 5,668,987 A | 9/1997 | Schneider |
| 5,680,573 A | 10/1997 | Rubin et al. |
| 5,682,527 A | 10/1997 | Cooper et al. |
| 5,701,461 A | 12/1997 | Dalal et al. |
| 5,706,506 A | 1/1998 | Jensen et al. |
| 5,727,203 A | 3/1998 | Hapner et al. |
| 5,745,904 A | 4/1998 | King et al. |
| 5,758,149 A | 5/1998 | Bierma et al. |
| 5,787,471 A | 7/1998 | Inoue et al. |
| 5,805,809 A | 9/1998 | Singh et al. |
| 5,812,996 A | 9/1998 | Rubin et al. |
| 5,822,749 A | 10/1998 | Agarwal |
| 5,826,253 A | 10/1998 | Bredenberg |
| 5,832,521 A | 11/1998 | Klots et al. |
| 5,835,908 A | 11/1998 | Bennett et al. |
| 5,835,959 A | 11/1998 | McCool et al. |
| 5,864,849 A | 1/1999 | Bohannon et al. |
| 5,897,634 A | 4/1999 | Attaluri et al. |
| 5,915,249 A | 6/1999 | Spencer |
| 5,933,593 A | 8/1999 | Arun et al. |
| 5,963,937 A | 10/1999 | Yamasaki et al. |
| 6,009,271 A | 12/1999 | Whatley |
| 6,014,673 A | 1/2000 | Davis et al. |
| 6,070,165 A | 5/2000 | Whitmore |
| 6,081,875 A | 6/2000 | Clifton et al. |
| 6,173,292 B1 | 1/2001 | Barber et al. |
| 6,314,417 B1 | 11/2001 | Bennett et al. |
| 6,321,235 B1 | 11/2001 | Bird |
| 6,330,565 B1 | 12/2001 | Nesbitt |
| 6,353,833 B1 | 3/2002 | Bird et al. |
| 6,446,062 B1 | 9/2002 | Levine et al. |
| 6,457,021 B1 | 9/2002 | Berkowitz et al. |
| 6,496,831 B1 | 12/2002 | Baulier et al. |
| 6,507,847 B1 | 1/2003 | Fleischman |
| 6,564,215 B1 | 5/2003 | Hsiao et al. |
| 6,574,639 B2 | 6/2003 | Carey et al. |
| 6,591,266 B1 | 7/2003 | Li et al. |
| 6,598,119 B2 | 7/2003 | Becker et al. |
| 6,609,126 B1 | 8/2003 | Smith et al. |
| 6,865,658 B2 | 3/2005 | Tomori et al. |
| 6,874,001 B2 | 3/2005 | Narang et al. |
| 6,877,014 B1 * | 4/2005 | Kasamsetty et al. ... 707/999.103 |
| 6,947,956 B2 | 9/2005 | Olstad et al. |
| 6,957,237 B1 | 10/2005 | Traversat et al. |
| 6,970,872 B1 | 11/2005 | Chandrasekaran et al. |
| 7,062,480 B2 | 6/2006 | Fay et al. |
| 7,222,117 B1 | 5/2007 | McGrogan |
| 2003/0120638 A1 | 6/2003 | Park et al. |
| 2003/0204504 A1 | 10/2003 | Stuy et al. |
| 2003/0221068 A1 | 11/2003 | Tsuji et al. |
| 2003/0225662 A1 | 12/2003 | Horan et al. |

OTHER PUBLICATIONS

Vassilis J. Tsotras & Nickolas Kangelaris, "The Snapshot Index: An I/O-Optimal Access Method for Timeslice Queries", Elsevier Science Ltd. (1995), Information Systems, 20(3):237-260.*

Berthold Reinwald et al., "Storing and Using Objects in a Relational Database", IBM Systems Journal (1996), 35(2):172-191.*

Kinsley, K.C. and Hughes, C.E., Analysis of a Virtual Memory Model for Maintaining Database Views, IEEE Transactions on Software Engineering, May 1992, pp. 402-409, vol. 18, Issue 5 (abstract only).

Birrell, A., Jones, M. and Wobber, E., A Simple and Efficient Implementation of a Small Database, ACM Symposium on Operating Systems Principles archive, 1987, pp. 149-154 (abstract only).

Traiger, Irving L., Virtual Memory Management for Database Systems, ACM SIGOPS Operating Systems Review archive, 1982, pp. 26-48, vol. 16, Issue 4, ACM Press, New York, NY (abstract only).

Ji, Minwen, Affinity-based Management of Main Memory Database Clusters, ACM Transactions on Internet Technology (TOIT) archive, 2002, pp. 307-339, vol. 2, Issue 4 (abstract only).

Dionn, IronEye Cache—Default branch, Freshmeat.net, May 30, 2003 12:08 PST (abstract only).

Hoverd, Tim, Livestore—Default branch, Freshmeat.net, Oct. 23, 2002 10:22 PST (abstract only).

No author listed, twx1jdbcForMysql—Default branch, Freshmeat.net, Aug. 1, 1998 22:04 PST (abstract only).

Darling, Aaron, mpiBLAST—Default branch, Freshmeat.net, Feb. 11, 2003 19:55 PST (abstract only).

* cited by examiner

INSTANTLY BUILT INFORMATION SPACE (IBIS)

FIELD OF INVENTION

Embodiments of the present invention are generally in the field of database storage and management, and specifically in the field of information spaces for application programs working with databases of transaction data.

BACKGROUND

In the information age, databases are a precious commodity, storing immense quantities of data for use in various applications. Latency, or time needed to access stored database data, is a crucial metric for many performance-intensive applications. Portfolio management applications, for example, are generally performance-intensive.

In-memory databases are the fastest possible databases. In such databases, which place the dataset in main memory, any piece of information is available with almost zero latency. The memory requirements of such databases increase with the size of the stored dataset. Therefore, such databases become excessively expensive from a hardware perspective when datasets are very large. In addition, computer manufacturers limit the amount of memory that can be installed in their machines, which limits the maximum size of the dataset that can be stored.

Some database systems address this memory problem by using software to cache portions of the dataset in main memory while keeping the majority in secondary memory (i.e., secondary storage), such as on disk. While this approach solves one problem, it creates another: Complex software must keep track of the location of the objects being stored, moving copies of the in-memory objects back and forth from the disk. This approach also increases complexity and latency, as software must determine where to look for the object—in memory or on disk. In addition, desired data must be copied to the application's memory space because, for data integrity and functional reasons, users cannot be allowed direct access to the database copy of the object, whether it is found in the memory cache or on the disk.

By transparently mapping data into and out of main memory, instead of copying the data into main memory, data can be accessed at speeds close to those achievable if the data were in main memory without requiring the copying of the data into and out of main memory. This approach is exemplified by the system described in U.S. Pat. No. 7,222,117 by McGrogan, entitled "Segmented Global Area Database", the entirety of which is herein incorporated by reference.

When dealing with additional sets of data, conventional database systems maintain a unified set of tables, each containing one type of database object. The tables are joined by linkages implemented in software inside the database, and are stored in the database as persistent data. Multiple databases cannot be quickly attached to and detached from each other, as they first need to be imported into the database as part of the unified set of tables. Creating additional sets of data by aggregating data already in the database increases the size of the database, as the amount of persistent data increases.

DETAILED DESCRIPTION

Some example embodiments of the present invention include a computer system for generating an Instantly Built Information Space (IBIS) for use with an application program 130. The application program 130 connects to a data repository 160 for a database 1004. The application program 130 connects to at least one Bookkeeping Information Space (BIS) 900. The address of a main database object 1003 of the BIS 900 is placed into a knowledge base pointer 1001. The address of a main database object 1002 of the database 1004 is placed into a pointer in an object of the BIS 900. The database 1004 and the BIS 900 are included in the IBIS. The BIS 900 is accessed by the application program 130 through the knowledge base pointer 1001 and the database 1004 is accessed by the application program 130 through the pointer in the object of the BIS 900.

Although various embodiments herein are discussed in connection with investment portfolio management systems, it is to be appreciated that the present teachings may be implemented in any context which utilizes databases, such as, for example, a trade order management system (TOMS) or partnership accounting system.

Various embodiments described herein have been recently implemented by Advent Software, Inc. (San Francisco, Calif.) in conjunction with the Geneva Segmented Advent Global Area (SAGA). Geneva SAGA is a portfolio management system that is used by institutions involved in the trading of investments.

Figure 1:
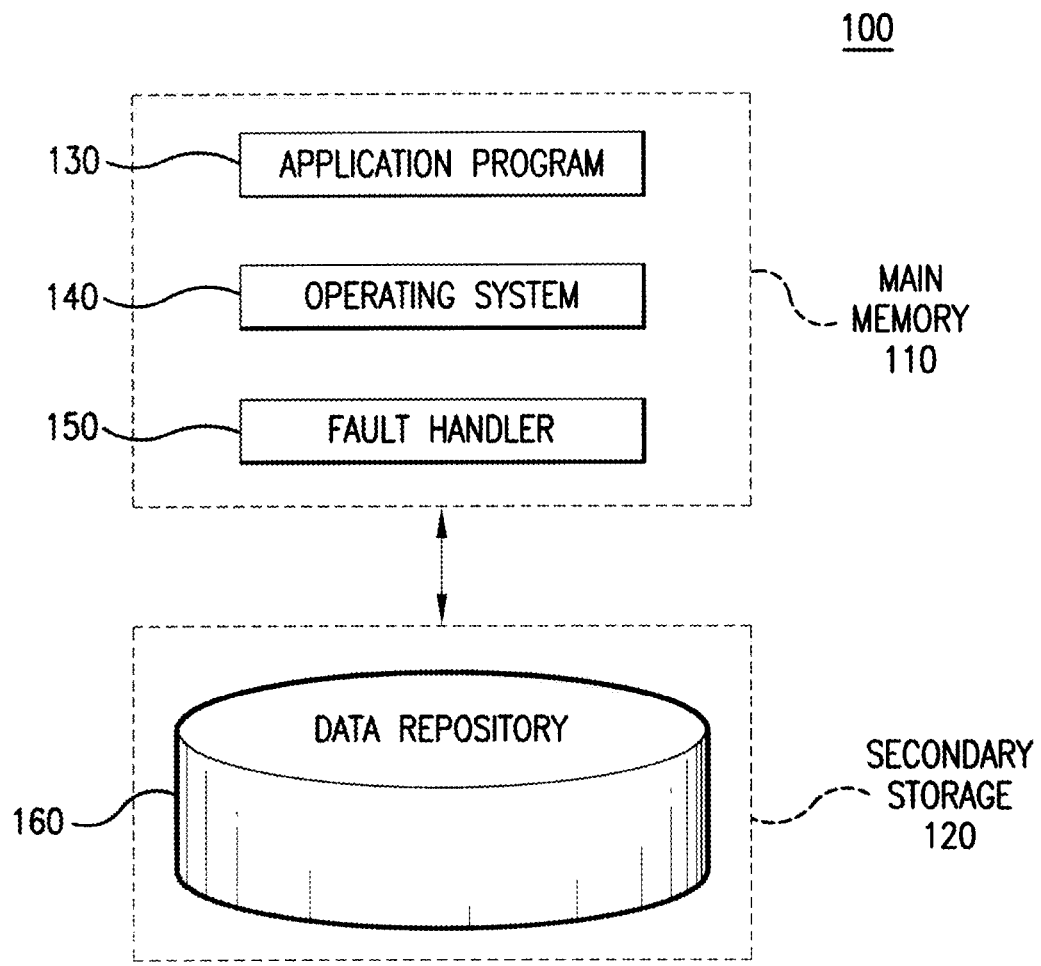
FIG. 1 depicts an exemplary hardware and software schema for a Segmented Advent Global Area (SAGA) database and an Instantly Built Information Space (IBIS)

FIG. 1 depicts an exemplary hardware and software schema for a SAGA database and an Instantly Built Information Space. The schema 100 may include a main memory 110 and secondary storage 120. Resident in the main memory 110 may be an application program 130, an operating system 140, and a fault handler 150. The secondary storage 120 may include a data repository 160.

The application program 130 may be programmed to access the data repository 160. The fault handler 150 may be associated with the data repository 160 and registered with the operating system 140. In an embodiment, the fault handler 150 may not be native to the operating system 140, which may include its own fault handlers. Instead, the fault handler 150 may be written particularly to enable interactions between the application program 130 and the data repository 160.

In an embodiment, the data repository 160 may include various file segments. At any one time, some file segments may be mapped into the main memory 110 while other segments may not be. The file segments in the data repository 160 may represent a SAGA database.

In an embodiment, when the application program 130 references an object that resides in the data repository 160, but is not currently mapped into the main memory 110, a segmentation fault may be issued by the computer hardware at an interrupt location in the application program 130. The fault handler 150 may be able to catch the segmentation fault. The fault handler 150 may then find a file segment of the data repository 160 that corresponds to the referenced object. That file segment may be mapped into the main memory 110, and the application program 130 may be restarted at the interrupt location.

In an embodiment, various software components of the schema 100 may be written in an object-oriented programming language, such as C++ or another such language.

Figure 2:
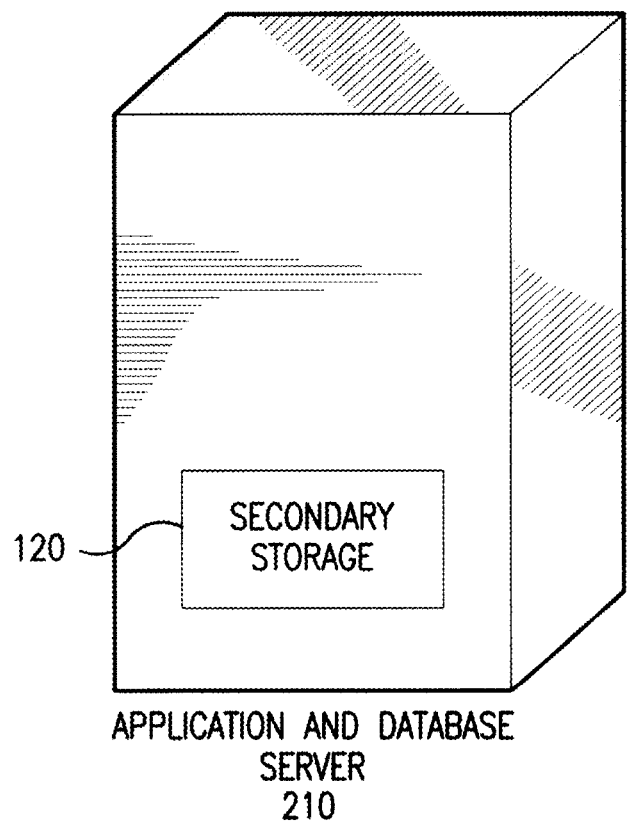
FIG. 2 depicts an exemplary system for a SAGA database and an Instantly Built Information Space.

FIG. 2 depicts an exemplary system for an instantly built information space. The system 200 may be an example hardware implementation of the schema 100 of FIG. 1.

The system 200 may include an application and database server 210. The server 210 may include the secondary storage 120, and may provide a platform for the application program 130, the operating system 140, and the fault handler 150 (not shown) of the schema 100 in FIG. 1. The system 200 may be implemented on one or multiple computers and/or storage devices.

In an embodiment, the system 200 may run on any computer that can run 64-bit Solaris version 8, 9 or 10, including, for example, any current SPARC platform such as Sun UltraSPARC or Fujitsu computer systems, or any x86-64 based platform using processors such as AMD®'s Opteron™ or Intel®'s Xeon®, Core™ 2, or Core™ i7 platforms. Embodiments herein may be implemented on any computer hardware/software systems that support virtual memory, allow user programs to catch segmentation violations, and allow catching routines to restart a faulting application by retrying the instruction that caused the segmentation violation. For example, embodiments may involve POSIX-compliant systems, such as all varieties of Linux systems, Apple's MacOS X, Sun's Solaris, and Microsoft NT, and its derivatives such as Windows 2000 and XP. In addition, the computer hardware of the system 200 may support 64-bit addressing, with at least 40 bits actually supported by the memory-mapping unit of that hardware. Accordingly, the system 200 may directly access 1 terabyte of data. The larger the number of bits actually supported by the memory-mapping unit, the greater the size of the supported database. Sun SPARC systems, for example, support a 44-bit memory mapping unit, which means that such systems may provide immediate access to 16 terabytes of data. In an exemplary embodiment, the computer I/O system of the system 200 can provide at least 3 megabytes/second of data transfer.

Returning to the schema 100 of FIG. 1, in an exemplary embodiment, data may be stored in the data repository 160 in the form of interconnected C++ objects. The objects may be accessed directly by an executing C++ program (e.g., the application program 130) and used as if they were part of the program's local memory. All the stored objects may be directly interconnected by memory pointers into one large matrix of information. Only rarely is information searched for as in the classic database model, since almost all information may already be pre-linked in the patterns in which it will be used. Unlike relational databases, which may use redundant data tables to represent these pre-linkages, any given data object in the data repository 160 may be stored only once. This may greatly reduce the total amount of storage required, may eliminate database internal consistency problems, and may simplify software development.

In an exemplary embodiment, each object in the data repository 160 may have knowledge times (time stamps) associated therewith, indicating when the object was first entered in the database and when it became invalid. Data may become invalid when it is deleted (expired) or updated (superseded by a new variant). This temporal information may allow the user to effectively move in time, permitting the reproduction of reports as they would have appeared at any time in the past. In an exemplary embodiment, each object may have a header defining such knowledge times.

The application program 130 may attach to the in-memory data repository 160 and map that repository into the virtual memory space of the application program 130. It may then access the repository objects as if all of them were part of its own memory. The repository objects need not be copied before being given to the application program 130 since they are protected from alteration by memory hardware. An unlimited number of copies of the application program 130 may attach to this shared memory simultaneously. Only one copy may write at any one instant.

Inside each object may be a virtual function pointer that points to a shared memory area that holds the virtual function tables, including virtual functions associated with object types. This pointer technique may allow a data repository object to work transparently for any application that touches it, regardless of where in memory an operating system loader places the virtual function tables. When an application attaches to the data repository 160, a startup routine may copy the virtual function table from the application to a specific address in this shared memory, based on an ObjectType field that is stored in each object. Each object in the data repository 160 may have had its virtual function pointer altered to point to this specific address when it was placed into the data repository 160. Accordingly, each object may now automatically find the correct virtual function definitions for the application that is using it, even if they have changed from the time when the object was originally placed in the knowledgebase.

Each object also may have a pointer to itself. This may allow an object to be asked for its shared memory address, no matter if the object is already in shared memory or is a local copy. The code may not need to worry about the actual residency of the object because it may always get a consistent answer.

Objects may be associated with each other by links. In an implementation, there may be three types of linkages in the data repository 160. Y Nodes may define the start of like types of objects; X Nodes may connect to particular object instances; and Z Nodes may be implicit in the objects themselves, pointing from one variant of an object to the next. (Y Nodes may actually contain the first X Node as part of themselves. They are described separately below to more clearly reveal the underlying paradigm.) Linkages may come in a number of variations: zero-or-once, once, once-or-many, zero-or-once-or-many. For example, in a portfolio management embodiment, a Buy may buy one and only one Investment. The link between a Buy and an Investment may therefore be of type "once". Linkage variation rules may be enforced at the time that objects or links are placed into the data repository 160.

In another example, the Buy of a stock may be made in terms of US Dollars (USD). To represent this relationship, the Buy object may be linked to the MediumOfExchange object USD by an X node. Each X node has may have its own KnowledgeBegin and KnowledgeEnd dates, as two objects that have independent existence may be linked to each other for a given period of time and then that linkage may be terminated. For example, BMW was originally traded in Deutsche Marks (DM), but is now traded in Euros (EU). The default trading currency linkage for BMW originally pointed to DM, but that X node link was expired and a new one was added pointing to EU.

In an embodiment, each object in the data repository 160 may have number of header fields that may identify the object, its virtual functions, where it is stored, and how to detect if it has been corrupted. The header may contain the following example fields:

ObjectType Identifies the class of this object. (A maximum of 65,000 object types may be supported.)

ObjectSync A 16-bit pattern chosen by statistical analysis to be least likely to appear in a knowledgebase. Used to assist in identifying the start of objects if data corruption occurs.

SegmentId Associates this object with a particular repository segment. The default value for this field is zero.

Vpointer C++ creates this field, which is a pointer to the virtual function table. The data repository 160 rewrites this pointer, when the object is being stored, so that each class's objects always point to a specific shared memory address. This allows an object to be given directly to many applications.

TreeCursor Points to a unique X node, which, in turn, points to the first object in a stack of temporal variations of the same object.

Roles Set of 32, 2-bit, user-role masks determining which user roles can read, write, or delete this object.

HashKey A 16-bit numerical value that provides fast go/no-go matching when looking through a pile of objects for one that matches a given primary key.

CheckSum A 32-bit value that is initially computed when an object is placed in memory. If the object and its checksum begin to disagree, memory corruption has occurred.

ObjectId A unique value assigned to this object. This field can be used to identify this object to external systems.

RefCounter Number of other objects pointing to this object.

NextItem Pointer to next temporal variant of this object. (Newest first.)

ShmAddress Pointer to this object's location in shared memory.

KnowledgeBeginDate Date this object was placed in knowledgebase.

KnowledgeEndDate Date this object was either deleted or replaced by a new variant.

Figure 3:
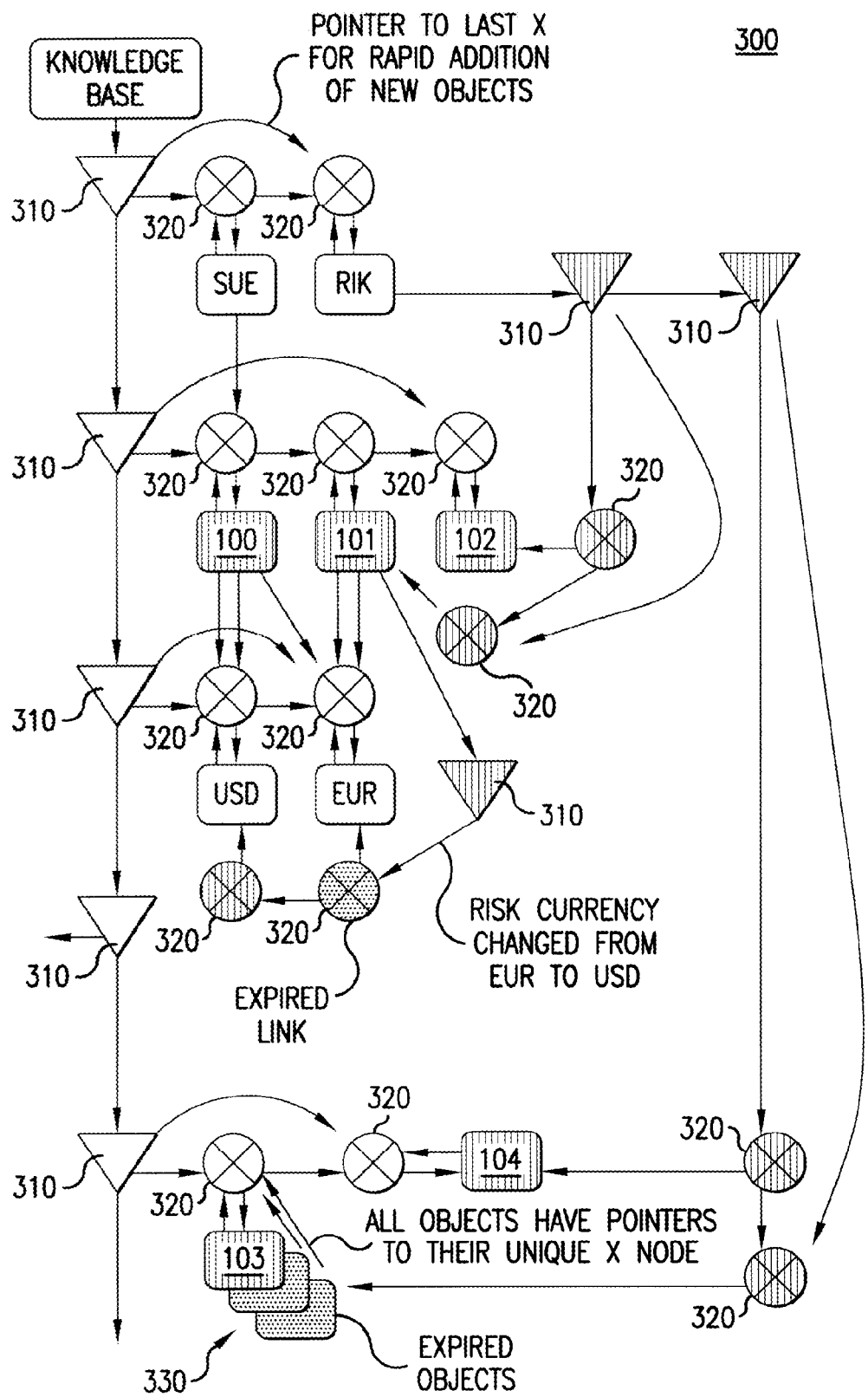
FIG. 3 depicts an exemplary structure for a SAGA database.

FIG. 3 depicts an exemplary structure for a SAGA database. The structure 300 may represent how various different objects are linked together in the data repository 160 by the application program 130. The structure 300 is not comprehensive and is merely illustrative of an example structure in a portfolio management database.

Y Nodes 310 are shown as triangles, X Nodes 320 as circles with X's in them, and Z nodes 330 are represented by variants stacked vertically, such as Deposit 103. The gray objects are in specific Portfolio repository memory segments, and non-gray objects are in the default segments (described below).

Examples of types of inter- and intra-object pointers are shown in FIG. 3. Since all the objects may be linked directly by memory pointers, an application such as the application program 130 may navigate from one data object to another at full memory speed. No "database" operations may be required.

A single object may have dozens of linkages to other repository objects. In an embodiment, since these linkages would quickly come to dominate the storage space, objects that are linked "once" to another object, with no variations in the link, may point to a special X Node, called a "unique" X Node. There may be one "unique" X Node for each object linked to the main knowledgebase object. This may be especially valuable in an example investments setting which has six different pointers to a MediumOfExchange. All of these pointers may generally be invariant, and all may normally point to the same object. These pointers may be PriceDenomination, BifurcationCurrency, RiskCurrency, IncomeCurrency, PrincipalCurrency, and PriceCrossingCurrency.

Figure 4:
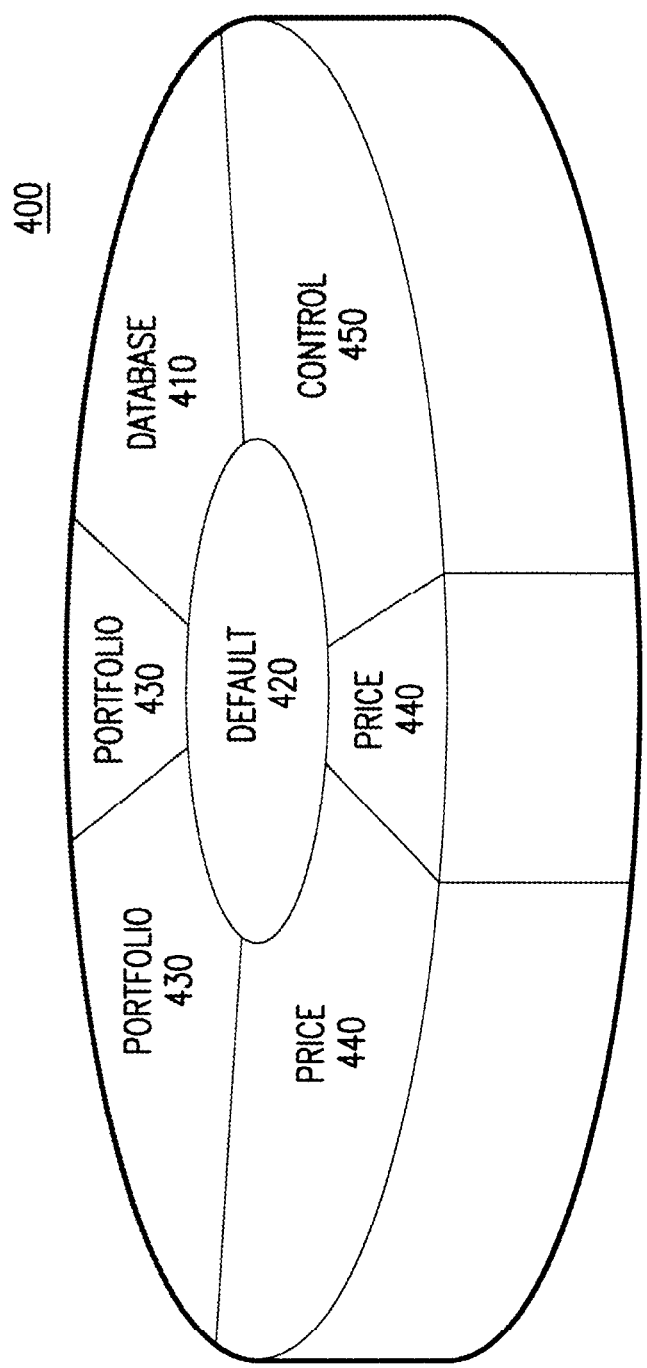
FIG. 4 depicts an exemplary repository for a SAGA database.

FIG. 4 depicts an exemplary repository for a SAGA database. The data repository 400 may be a logical representation, showing example kinds of data segments in a portfolio management application.

In an example embodiment, there may be five types of data segments in the data repository 400: database, default (or core), portfolio, price, and control. The database segment 410 may hold those objects that define the database. This segment may include the database logfile write buffer, the current database status, and Segment and SegmentFile objects that point to all the other segments in the data repository 400.

The price segments 440 may contain all non-MediumOfExchange PriceDay objects as well as links to them. Each price segment 440 may represent one month of prices for all investments in the associated portfolio management application. The price segments 440 may appear as files to the system, with names containing the year and month in human-readable format.

The portfolio segments 430 may hold all the transactions for individual portfolios as well as the links pointing to them, all objects owned by them, and all links pointing to those owned objects. (For example, Reorganization transactions own ReorganizationElements. These ReorganizationElements and the links to their Reorganization parents are all in the same segment as the Reorganization that owns them.) In an embodiment, if the objects are linked to the main knowledgebase object, those links may not be placed in the portfolio segments. The Portfolio objects themselves may also not be placed in the segments so that they can be searched without paging through the portfolio segments.

The control segment 450 may store all the UserSession and Agent objects that track usage of the knowledgebase. There may be only one control segment 450, just as there may be only one database segment 410.

The default (or core) segment 420 may hold everything that is not placed in any other segment. In an embodiment, the default segment 420 may hold about 10-20% of the data.

In an embodiment, a hash table (not shown) may reside in the default segment 420. This table allows rapid object access given either primary or secondary keys. Not all object types may have entries in this table. Only those that potentially are numerous and might be searched for by key may be indexed here. For example, users may look for a particular PortfolioEvent by using a secondary key that they have provided. This table may immediately locate the matching event. The table also may be used to ensure that all primary and secondary keys are unique when a new object is entered into the knowledgebase.

In an embodiment, objects stored in the memory-mapped file segments of the data repository 160 (FIG. 1) or 400 (FIG. 4) may be divided into groups, called species. Example species may include Prices, PortfolioEvents, control objects (Agents, UserSessions), derived numerical results (such as Time Weighted Return (TWR) values), and core objects (everything else). An individual segment may only contain objects of a particular single species. While the species may define the segmentation scheme, an individual within a species may be referred to as a specimen. For example, each Portfolio may constitute a specimen of the PortfolioEvent species. Each PriceMonth may constitute a specimen of the Price species.

In a particular embodiment, memory-mapped file segments may range from 1 to 16 megabytes in size. Segments may grow automatically from minimum to maximum size as objects are added to them, overflowing into new segments if 16 megabytes is insufficient.

In an embodiment, a user-specified maximum number of segments from each species may be held in memory. These segments may be evicted from memory on a least-recently-used (LRU) basis. Segments may be placed in memory whenever objects that they contain are referenced by the application program 130. The system may run with as little as one segment from any species in memory. As such, a user may have total freedom in defining the number of segments that may be concurrently mapped at any one moment.

In an embodiment, to support the splitting of a data repository into segments, object insertion routines may test virtual functions that specify how each object type is to be handled during insert. For example, Portfolio-related events may be stored in clusters that are mapped together in memory based on their associated Portfolio.

In an example implementation, when a portfolio is added to the data repository, it may be assigned a 16-megabyte address at which to start storing its events. This address may be a direct function of the segment identifier that is placed in the Portfolio object. All events associated with this Portfolio may be placed in this allocated memory. Assuming a 44-bit virtual address space, such as provided by SPARC CPUs, more than 1,000,000 Portfolios are supported, each holding about 40,000 events. It is to be understood that reducing the 16-megabyte default size for a segment may increase the maximum number of Portfolios that can be supported. In a setting that hosts tens of millions of small, relatively inactive Portfolios, such a reduction may be particularly valuable.

If the 16 megabyte area reserved for the Portfolio is filled, a new, not necessarily contiguous, allocation may be created, and filling of the allocated space resumes. In this way, there is no limit to the size of the stored Portfolio. Segment memory may not be completely zeroed when it is allocated; thus, no page faults occur in the unused memory.

In an embodiment, a segment address allocation algorithm may involve a highest segment address. The highest segment address may be stored in a database object as a reference. When a new segment is required, it may be allocated from this address, and the address may then be incremented by 16 megabytes.

When an application process attempts to access memory associated with a Portfolio, memory that is not already mapped may cause a segmentation violation (SIGSEGV). The fault handler may then determine if this is a true memory access error or just a request for a segment that is not yet in memory. If the SIGSEGV results from a segment request, the handler may memory-map the segment and restart the operation.

In an embodiment, although memory space is allocated in 16-megabyte segments, the underlying mapped files may be created and extended in smaller segments, such as 1-megabyte segments. Such a partial allocation approach may greatly lessen the physical disk space needed to store thousands of small Portfolios and reduces backup and file transfer times.

Processes may detach the segments that they are no longer using. A maximum memory usage may be enforced where segments are unmapped in a least-recently-used (LRU) manner whenever a user-specified limit is reached. In a portfolio management embodiment, only a few months of prices may need to be mapped into memory at any given time.

In an example implementation, the data repository 160 or 400 holding mapped data segments may be stored on a disk subsystem that is connected to a NFS (Network File System) or similar network. Accordingly, the mapped files of the data repository may be accessible via NFS from multiple remote computers simultaneously. As such, users who have numerous small computers may team the computers to satisfy large batch processing requirements. Such remote processing may be further facilitated by the fact that the network need only transport those data segments that are needed by the remote computers. Such an implementation may be scalable, enabling databases to grow extremely large, not limited by hardware memory constraints and associated cost factors.

It is to be appreciated that, because users can leverage existing networks of computers to accelerate batch runs, TCO (Total Cost of Ownership) may be lowered, and batch cycle completion times may be improved. In addition, troubleshooting of database problems may be performed more rapidly and responsively, as less data needs to be transferred, and tests may be performed using smaller, more readily available computers.

Figure 5:
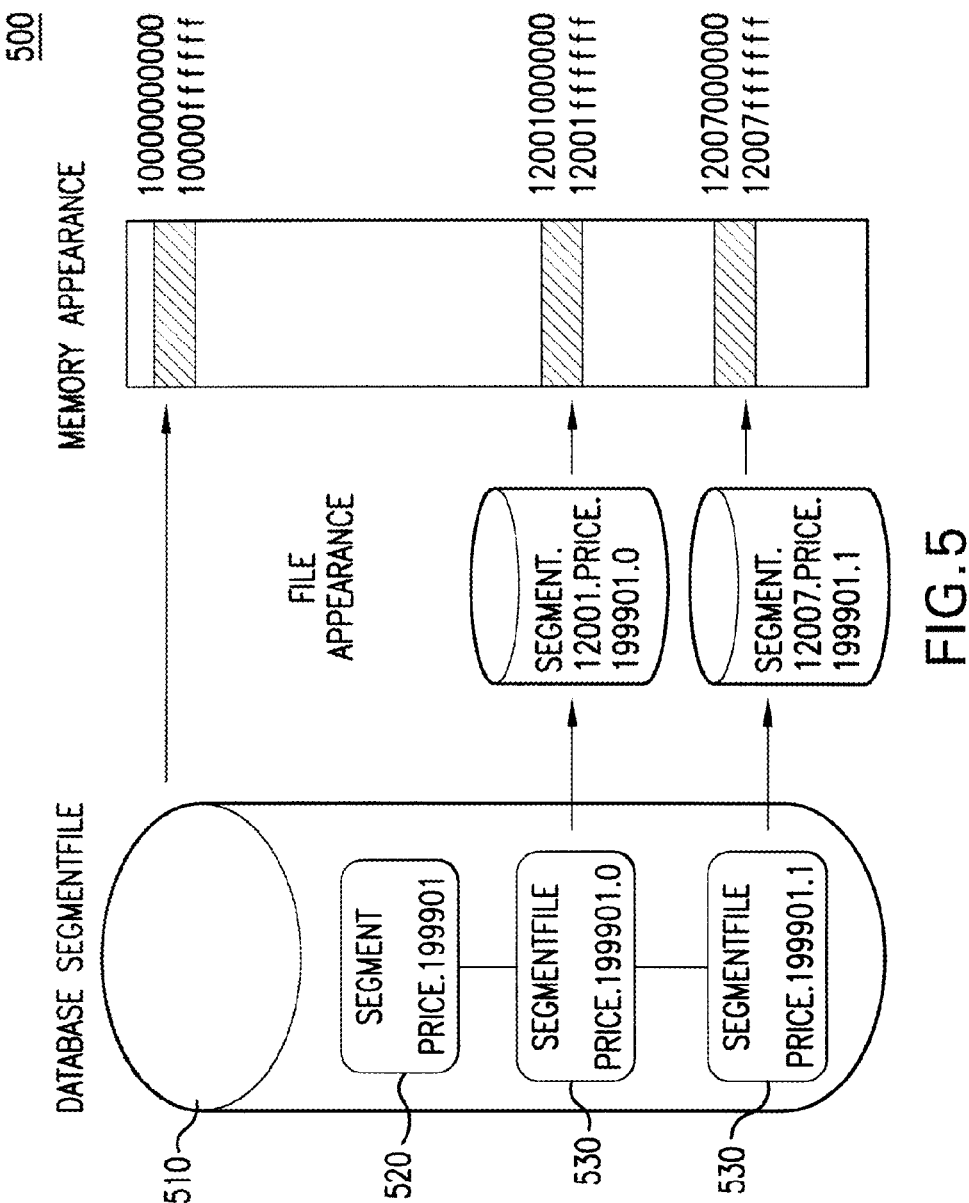
FIG. 5 depicts an exemplary memory-mapped segment file for a SAGA database.

FIG. 5 depicts an exemplary memory-mapped segment file for a SAGA database.

In an embodiment, segment files may be named such that they can be quickly located and mapped back into main memory when a corresponding object referenced by an application leads to a segmentation fault. In particular, the names of segment files may relate to the address of the corresponding object that leads to the segmentation fault.

In an embodiment, the organization of data into memory-mapped segment files may be influenced by a consideration of a logical view of the data, such as interrelationships among data. For instance, related data may be clustered together. Accordingly, the amount of data that needs to be mapped into main memory at any one moment may be greatly reduced. In addition, the application program may run faster because cache hit rates may be improved, and TLB (translation lookaside buffer) misses minimized. Further, segment files may be dropped to purge data from the data repository when necessary or desired.

Since segment files are used to store data, there may be potentially a large number of files stored in segment directories. In an implementation, these files may be protected and stored on a device that provides adequate data velocity and capacity. The embodiments herein may reduce the amount of swap disk space required to run an application program. This reduction may occur since a multiprocessing operating system must reserve disk swap space equal to the size of the programs kept in process memory. It must reserve this space so that it can move the task out of main memory and onto its swap disk if a higher priority program needs to run. The embodiments may herein reduce the amount of swap space that is required, as most of the data may not be mapped into memory at any given moment, and that which is mapped into memory may be mirrored by the disk files themselves. This means that the operating system may not need to reserve swap disk space for this data, whether it is mapped into memory or not.

In a particular embodiment, a segment, such as a segment for a Portfolio, may be stored in a Segment Library, which may have a two-level directory structure. Two ASCII-formatted, hexadecimal digit sequences, representing a portion of the segment's memory address, may create file and directory names. The file name may also contain the name of the Portfolio for human accessibility. For example, if a report starts processing the PortfolioEvents for Portfolio Fred, and Fred's events have not previously been used, a memory fault might occur at (hexadecimal) address 0x11234567890. The fault handler for the data repository may then attempt to open the segment directory segment.4635.112, looking for a filename matching the pattern segment.4635.11234.*. The file segment.4635.11234.portfolio.fred.0 will match this pattern, and the fault handler may then map this file at address 0x11234000000 for 16-megabytes. If present, this file may be attached and the process is restarted.

If a very large Portfolio requires more than one segment, its subsequent segments may have ascending final digits; for example, Fred's Portfolio might have files segment.4635.11234.portfolio.fred.0, segment.4635.112f5.portfolio.fred.1, and segment.4635.1134a.portfolio.fred.2. (Segment addresses may start, for example, at virtual address 0x10000000000, which is 1 terabyte.) It is to be noted that no central lookup table may be necessary because the address provides all information that is needed.

The above naming convention may enable support of multiple data repositories stored in the same directory, as well as access to 15 terabytes out of the 16-terabyte virtual address space. Further, an administrator may easily locate the files belonging to a particular data repository or portion thereof.

In an example implementation, segmentation also may be employed to store prices. Each PriceMonth, in a main database, may point to its child PriceDays, which may be stored in their matching segments. When a segmentation violation occurs, the segment may be loaded into memory, and processing may be resumed. Such operations may be transparent from the perspective of the application program.

Price segments may have names of the form segment.4635.10008.price.200111.0, where 4635 is the hexadecimal data repository name, 10008 indicates that this page maps at address 0x10008000000, price shows that this is a price segment, 200111 indicates that this is a price segment for November, 2001, and 0 indicates that this is the first segment in what might be a chain of segments for this month.

It is to be appreciated that analogous naming conventions and organizational techniques to those above may be employed in contexts other than portfolio management applications.

FIG. 5 shows example linkages of the stored database objects and the segmentfiles that hold the data that is memory-mapped when referenced. Three segmentfiles are shown. The first is the Database segmentfile 510, which contains the segment 520 and segmentfile 530 objects. The segmentfile 530 objects are normal object segmentfiles. In the example of FIG. 5, they both contain investment price objects for January 1999. The segmentfile names may be automatically generated from the keys of the objects being stored and the memory ranges that the data repository routines allocate for them. A segmentfile may start at 1 megabyte in size and may be extended to a maximum of 16 megabytes. If more space is needed, a new segmentfile may be created. In various embodiments, a segment may own many non-contiguous segment files.

Figure 6:
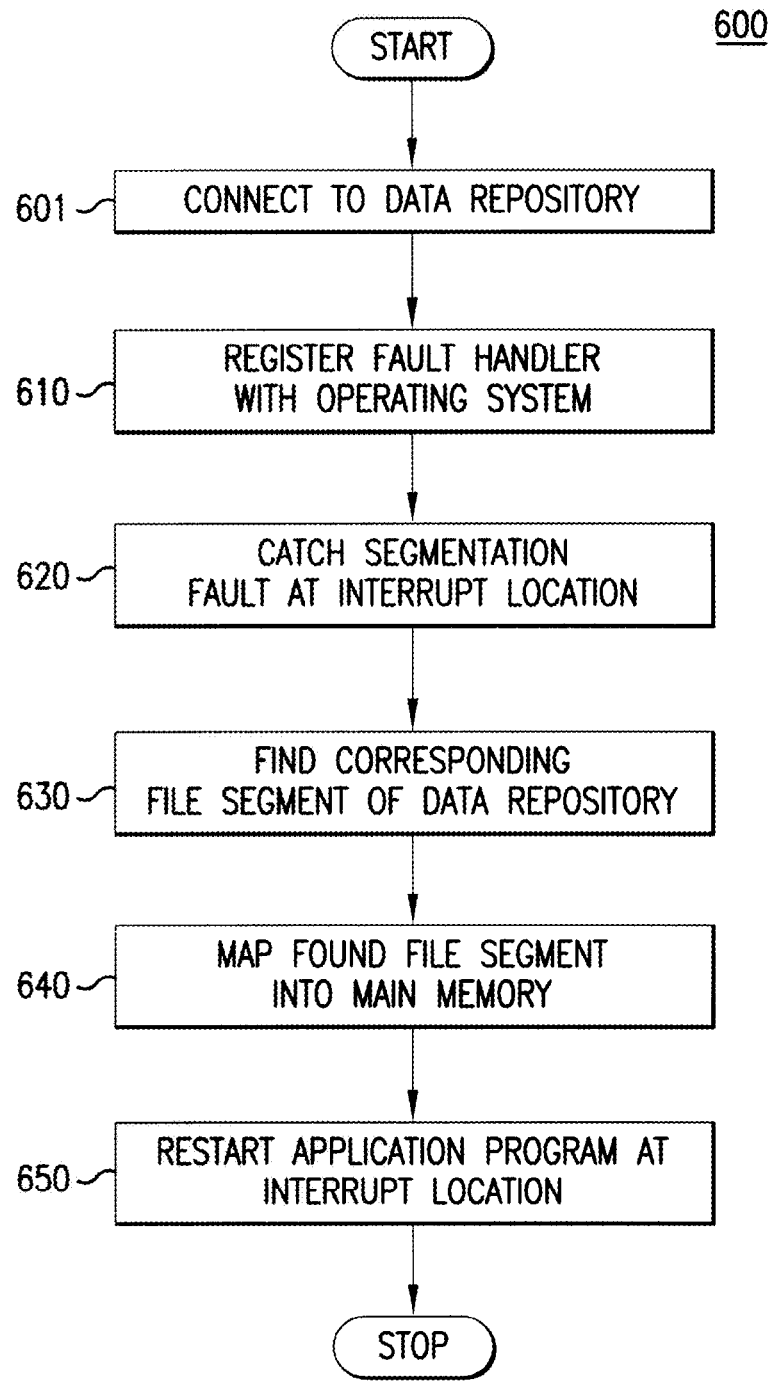
FIG. 6 depicts an exemplary procedure for memory mapping a SAGA database.

FIG. 6 depicts an exemplary procedure for memory mapping a SAGA database. The process 600 may be used for memory mapping of databases consistent with the schema 100 of FIG. 1, as well as with other embodiments herein, such as shown in FIGS. 2-5.

In task 601, an application program may connect to a data repository of a database. The data repository may include a plurality of memory-mapped file segments stored on at least one nonvolatile memory medium.

In task 610, a fault handler for the data repository may be registered with the operating system on which the application program runs. In task 620, the fault handler may catch a segmentation fault issued for a data repository object that is referenced by the application program but not currently mapped into main memory. The segmentation fault may be issued at an interrupt location in the application program.

In task 630, a file segment of the data repository corresponding to the referenced object may be found. In task 640, the found file segment may be mapped into main memory. In task 650, the application program may be restarted at the interrupt location at which the segmentation fault was issued.

Figure 7A:
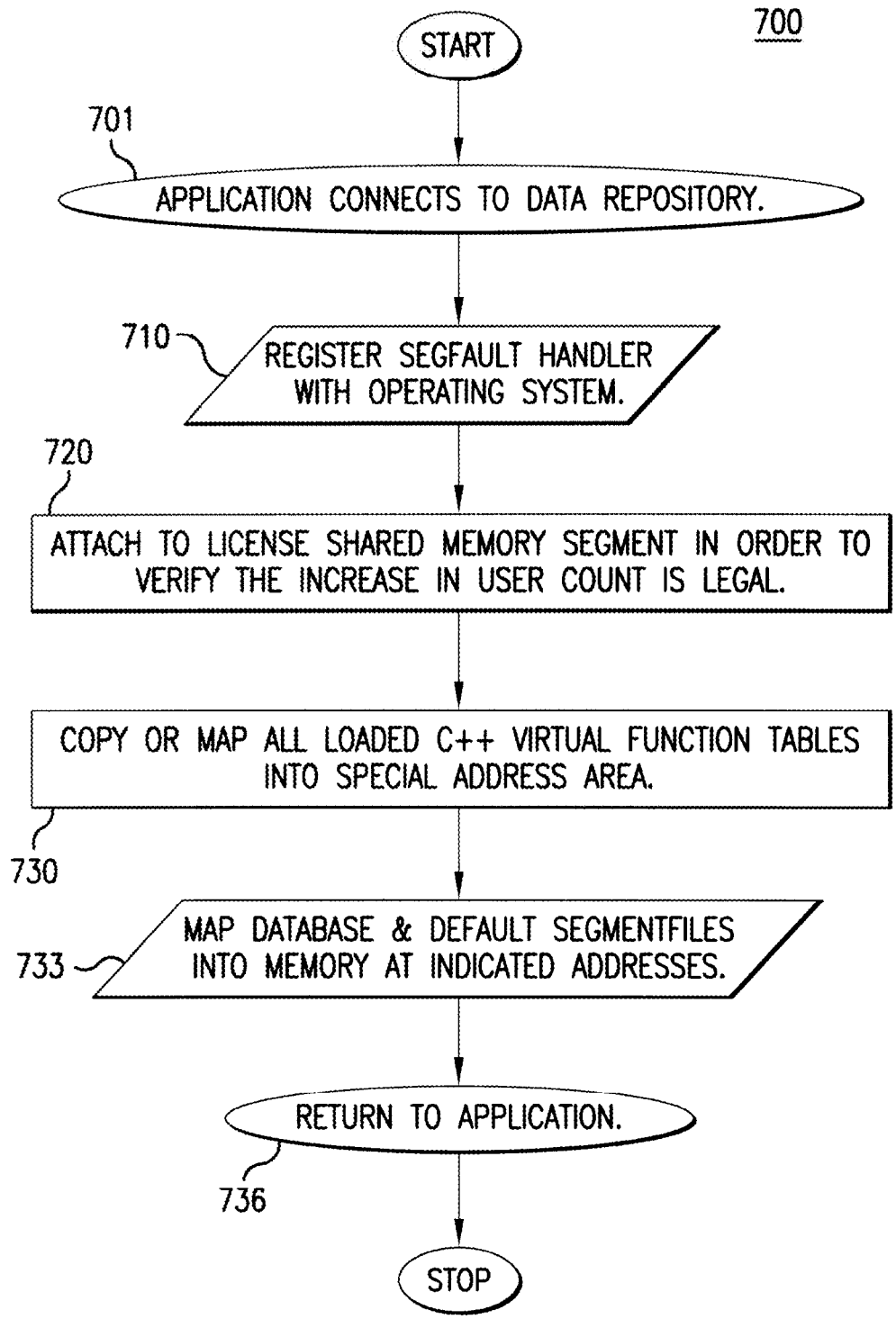
FIG. 7A depicts an exemplary procedure for memory mapping a SAGA database and interacting with outside routines.
Figure 7B:
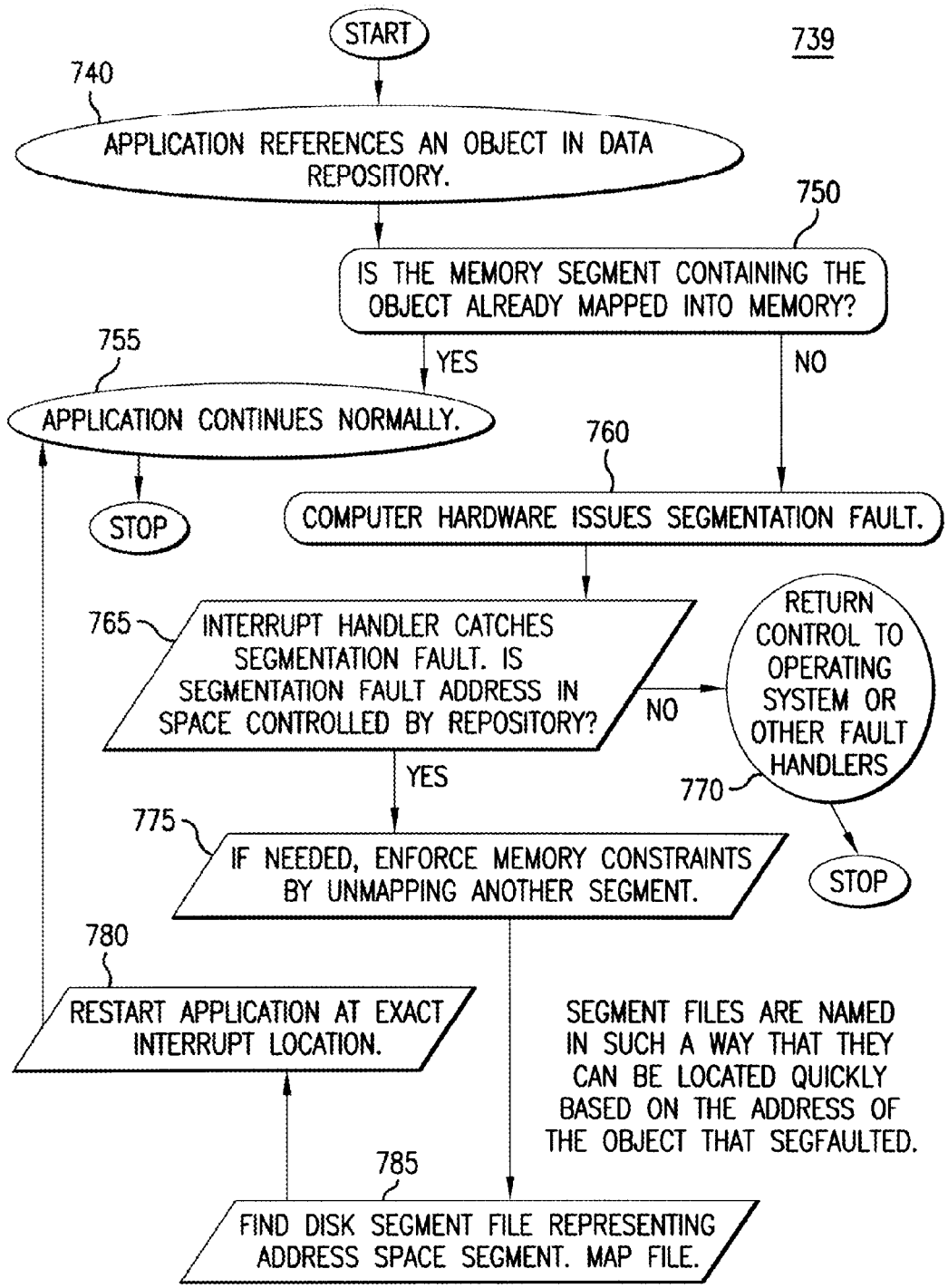
FIG. 7B depicts an exemplary procedure for the operation of a SAGA database.

FIG. 7A depicts an exemplary procedure for memory mapping a SAGA database and interacting with outside routines. FIG. 7B depicts an exemplary procedure for the operation of a SAGA database. The processes 700, 739 are similar to the process 600 in some respects. The ellipses in the processes 700, 739 show interfaces to outside routines, such as application program(s). Rounded rectangles show computer hardware actions.

In task 701 of FIG. 7A, an application may connect to the data repository. In task 710, the repository interrupt handler (SEGFAULT) may be registered with the operating system. This interrupt handler may be able to catch segmentation faults issued by computer hardware during the course of execution of an application.

In task 720, the application may attach to a license shared memory segment. This task may be used to verify that the increase in user count is legal. Task 720 need not be performed in certain embodiments.

In task 730, all loaded C++ virtual functions may be copied or mapped into a special address area.

In task 733, database and default segment files may be mapped into memory at the addresses indicated by their names. For example, the database segment file that is named segment.10000.database.1.0 may be mapped into memory starting at location 0x10000000000. Similarly, the first default segment, segment.10001.default.1.0, may be mapped starting at location 0x10001000000. This mapping may be done using the same address mapping methodology depicted in FIG. 5.

In task 736, control may be returned to the application.

Turning to task 740 of FIG. 7B, the application may reference an object in the data repository. The memory segment for that object may or may not be already mapped into main memory. Task 750 may determine which is the case. If the segment is already mapped into main memory, then in task 755, the application may continue normally.

If the segment is not already mapped, then the computer hardware may issue a segmentation fault (task 760).

In task 765, the interrupt handler may catch the segmentation fault. It may be determined whether the segmentation fault address is in the space controlled by the data repository. If not, then control may be returned to the operating system or other fault handlers (task 770).

If the fault address is in that space, then, if needed, memory constraints may be enforced by unmapping another segment (task 775). The disk segment file that represents the address space segment may be found, and the file may be mapped to main memory (task 785). As mentioned above, segment files may be named in such a way that they can be located quickly based on the address of an object that led to a segmentation fault.

In task 780, the application may be restarted at the exact interrupt location associated with the segmentation fault.

Figure 8:
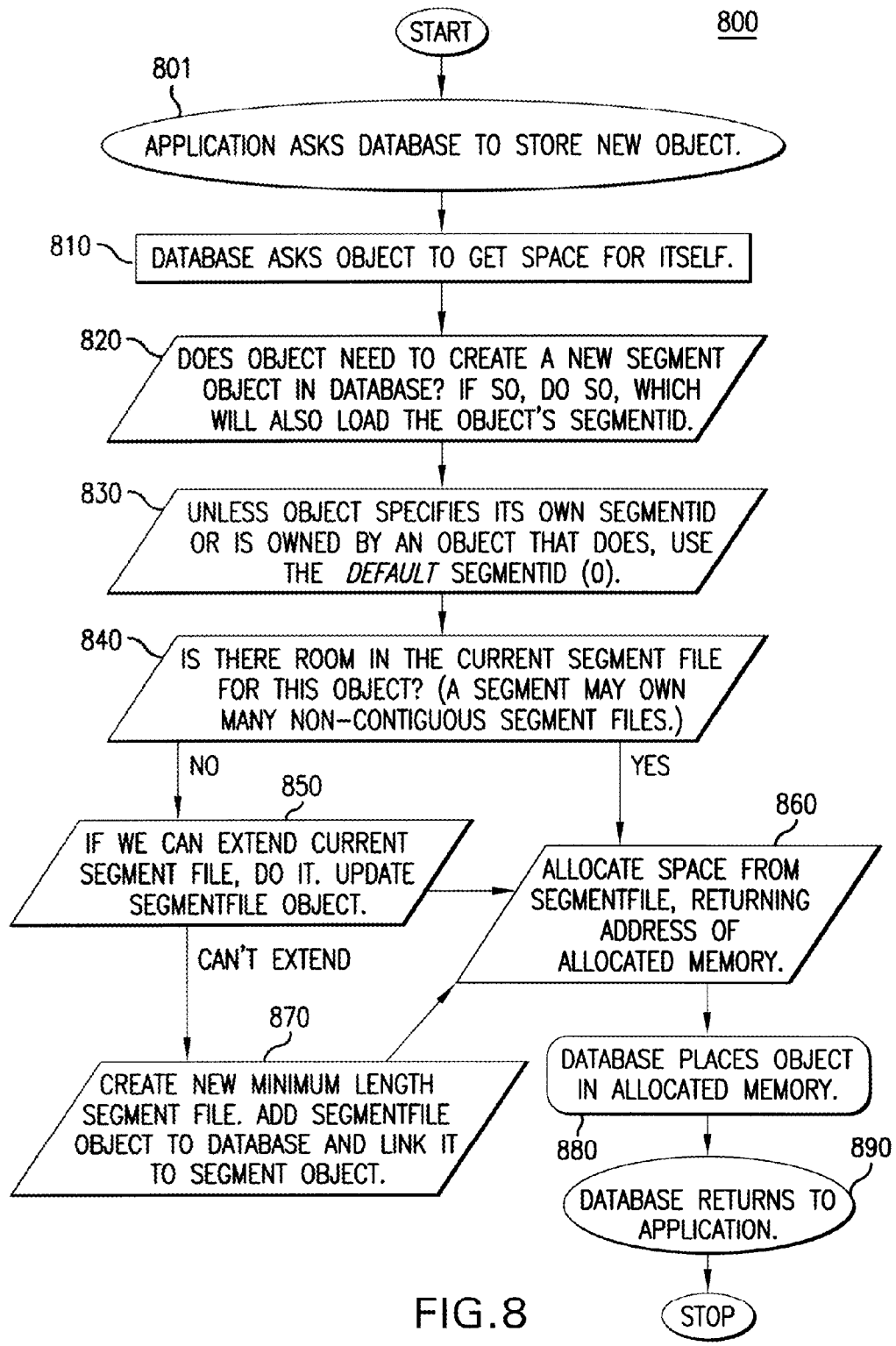
FIG. 8 depicts an exemplary procedure for storing a new object in a SAGA database.

FIG. 8 depicts an exemplary procedure for storing a new object in a SAGA database. The process 800 may be applied when new objects need to be stored in the data repository.

In task 801, an application desiring to add an object to the database calls either an insert or update subroutine as defined by the database API (Application Program Interface). By calling this appropriate subroutine, control may be passed to the database routines (task 810), which attempt to perform the corresponding operation and return their success or failure back to the application (task 890).

In task 820, if the object needs to create a new segment object in the database, the segment object may be created, which also loads the object's segmentID. A new segment object, with its new corresponding segmentID, may be required if the object being stored is the first instance of a new species member. For example, in an embodiment, suppose a new Portfolio, Jean, is added to the database. When the first trade for Portfolio Jean, a Buy for example, must be inserted, there may be no place to put this Buy until a segmentfile is created with a corresponding name and a new segment object to point to it. If the segment object already exists, it will have been retrieved as part of the test performed in task 820 and, as such, the stored object's appropriate segmentID will be known.

Unless the object specifies its own segmentID or is owned by an object that does, the default segmentID(0) may be used (task 830). In task 840, the process may determine whether there is space for this object in the current segment file. If so, then space may be allocated from the segmentfile, and the address of allocated memory may be returned (task 860). If not, the current segment file may be extended if possible, and the segment file object may be updated (task 850). Otherwise, a new minimum length segment file may be created, the segment file object may be added to the database, and the segment file object may be linked to the segment object (task 870).

In task 880, the database may place the object in the allocated memory. The database may return to the application in task 890

As described above, a SAGA database may contain various persistent objects. Once an object is entered into the SAGA database, it may never be removed. If an object is updated, instead of being removed, a new variant of the object may be created and the original object may have a knowledge end time set to the moment of the creation of the new variant. The objects in the SAGA database may represent the holdings in various investment portfolios, however, the SAGA database may not include objects that aggregate, or otherwise represent the holdings of individual portfolios or groups of portfolios. The SAGA database may include no consolidated views of the data in the SAGA database.

For example, an individual with a portfolio may wish to know how much the portfolio is worth at a given time, how many shares of various equities are held in the portfolio, what percentage of the total value of the portfolio different equities represent, and so on. The various aggregates and statistical representations may be calculated based on the objects in the SAGA database, but may not be stored in the SAGA database. Some portfolios may include millions of objects, which may make calculating various aggregate and consolidated views a processor-intensive, time-consuming task.

Once the aggregates and statistical representations are calculated for a portfolio in the SAGA database the first time, the data produced may be stored. Because the data for the aggregates and statistical representations may not represent real world persistent data, but rather a numerical derivative of that data, the data may not be stored with the persistent objects in the SAGA database. The data may be stored in a quasi-persistent Bookkeeping Information Space (BIS).

Figure 9:
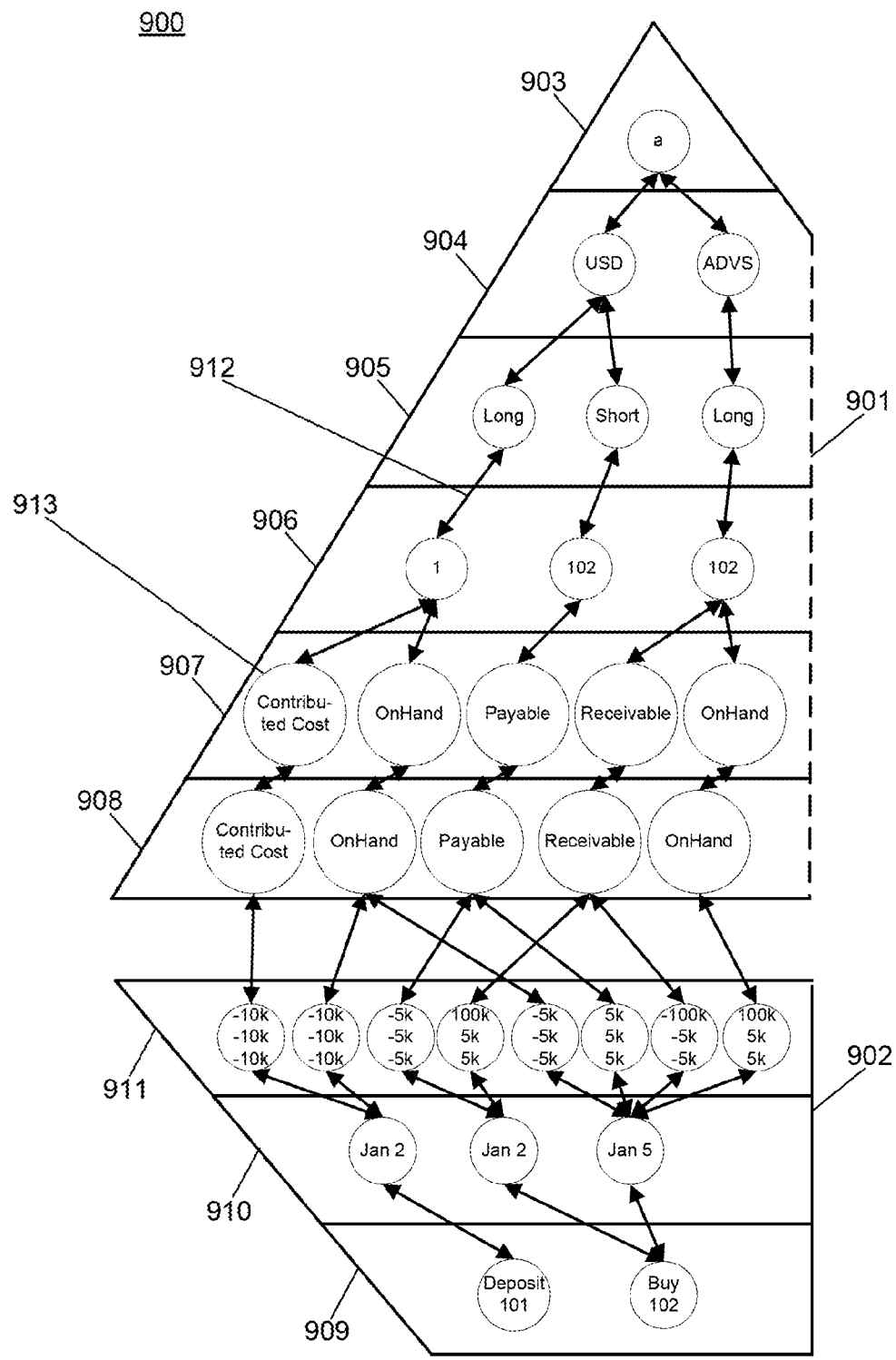
FIG. 9 depicts an exemplary Bookkeeping Information Space (BIS) sub-database.

FIG. 9 depicts an exemplary Bookkeeping Information Space (BIS) sub-database. Arrows represent pointers, such as the pointer 912. Circles represent objects, such as the object 913. A BIS 900 may include two hierarchies, an Aggregation Hierarchy 901 and a Transaction Hierarchy 902. The Aggregation Hierarchy 901 may represent the various ways of aggregating bookkeeping accounts from the Transaction Hierarchy 902. The Transaction Hierarchy 902 may represent actual portfolio transactions, such as buys, sells, and dividends.

The Transaction Hierarchy 902 may include a portfolio transactions layer 909, a journal entries layer 910, and a journal entry lines layer 911.

The portfolio transaction layer 909 may include objects representing actual portfolio transactions that have occurred for the portfolio represented in the BIS 900. The journal entries layer 910 may include objects representing the dates on which journal entries were made into the double-entry bookkeeping system of a portfolio management system representing the transactions for the portfolio. The journal entry lines layer 911 may include objects representing journal lines created on a journal entry date. The objects in the Transaction Hierarchy 902 may include pointers to the objects in the layers above (parent objects) and below (child objects), and to the left and right (sibling objects).

The Aggregation Hierarchy 901 may include a portfolio account layer 903, an investment positions layer 904, a local position layer 905, a tax lot layer 906, a role tracking lot layer 907, and a bookkeeping account layer 908.

The portfolio account layer 903 may include an object representing the portfolio represented in the BIS 900. The portfolio may correspond to a portfolio with objects in the data repository 160 that holds the SAGA database. The object on the portfolio account layer 903 may provide an aggregate view of the entire portfolio represented by the BIS 900 based on the journal entries from the Transaction Hierarchy 902. The object in the portfolio account layer 901 may include a reciprocal pointer to objects in the investment positions layer 904, as well as pointers to sibling objects on the right and left, if they exist.

The investment positions layer 904 may include objects representing the various investment positions held in the portfolio represented in the BIS 900. The positions may be determined based on the objects in the data repository 160 for the portfolio. For example, the portfolio represented in the BIS 900 may hold investment positions in United States Dollars (USD) and Advent Software, Inc. (ADVS). Objects in the investment positions layer 904 may include reciprocal pointers to objects in the local positions layer 905, as well as pointers to sibling objects on the right and left, if they exist.

The local positions layer 905 may include objects representing the nature of the various positions from the investment positions layer 904. The nature of the investment positions may be determined based on the objects in the data repository 160 for the portfolio. For example, the portfolio represented in the BIS 900 may have a long position and a short position in USD, and only a long position in ADVS. Objects in the local positions layer 905 may also indicate the custodian of the fund holding the positions, the name of the fund holding positions, the structure of the fund holding the positions, and so on. Objects in the local positions layer 905 may include reciprocal pointers to objects in the tax lot layer 906, as well as pointers to sibling objects on the right and left, if they exist.

The tax lot layer 906 may include objects indicating the tax lots of the positions from the local positions layer 905 and their corresponding investment positions from the investment positions layer 904. The tax lot for the positions may be determined based on the objects in the data repository 160 for the portfolio. Objects in the tax lot layer 906 may include reciprocal pointers to objects in the role tracking lot layer 907, as well as pointers to sibling objects on the right and left, if they exist.

The role tracking lot layer 907 may include objects representing the status of the various investment positions in the portfolio. The status of the positions may be determined based on the objects in the data repository 160 for the portfolio. Objects in the role tracking lot layer 907 may include reciprocal pointers to objects in the bookkeeping account layer 908, as well as pointers to sibling objects on the right and left, if they exist.

The bookkeeping account layer 908 may include objects representing the bookkeeping status of entries for the various investment positions in the portfolio, based on the objects in the journal entry lines layer 911 of the Transaction Hierarchy 902. Objects in the bookkeeping account layer 908 may include reciprocal pointers to objects in the journal entries lines layer 911 of the Transaction Hierarchy 902, as well as pointers to sibling objects on the right and left, if they exist.

Each object in the Aggregation Hierarchy 901 may represent a possible aggregated or consolidated view of the data. For example, the "a" object in the portfolio account layer 903 may represent an aggregate view of the entire "a" portfolio. The objects on the investment positions layer 904 pointed to by the "a" object may represent aggregate views of the investment positions held by the "a" portfolio. For example, The USD object in the investment positions layer 904 may represent an aggregated view of data from the SAGA database for the "a" portfolio's investments in USD. This may allow for more refined aggregate views of the holdings of the "a" portfolio by proceeding down the layers in the Aggregation Hierarchy 901.

Objects in the BIS 900 may point directly to each other, because, unlike the structure 300 for the SAGA database, there may be no variants of objects in the BIS 900. The BIS 900 may represent a snapshot of a particular moment in time from the SAGA database, and will therefore only make use of the particular variants in the SAGA database that correspond to that moment in time. The BIS 900 may not contain any variants of any of its objects. Instead, changes to the data in the data repository 160, which result in the creation of variant objects in the data repository 160, may result in objects in the BIS 900 being updated, replaced, or deleted, as necessary, or the BIS 900 being rebuilt entirely.

For example, if the BIS 900 is created using a knowledge date of Jul. 1, 2009, the data from the data repository 160 for the SAGA database used to create the BIS 900 may only be from objects that have not reached their knowledge end date as of Jul. 1, 2009. If the BIS 900 is later updated using a knowledge date of Aug. 1, 2009, pointers from the BIS 900 to any objects from the data repository 160 that have reached their knowledge end date in the intervening time may not be used, and will be replaced by the variants of the objects that were current on Aug. 1, 2009. No variant objects may be created in the BIS 900 to reflect these changes in the objects used. Instead, objects in the BIS 900 that are changed because of changes in the objects used from the SAGA database may be updated to reflect the changes in objects, so that the BIS 900 reflects the most current set of data for the knowledge date used to create the BIS 900.

Objects in the BIS 900 may have their virtual function table pointers rewritten in the same manner as objects in the data repository 160 for the SAGA database, as described above. This may allow objects in the BIS 900 to be accessed like objects in the SAGA database, as the objects in the BIS 900 will not be sensitive to where the operating system loader has placed the real virtual function tables.

Figure 10A:
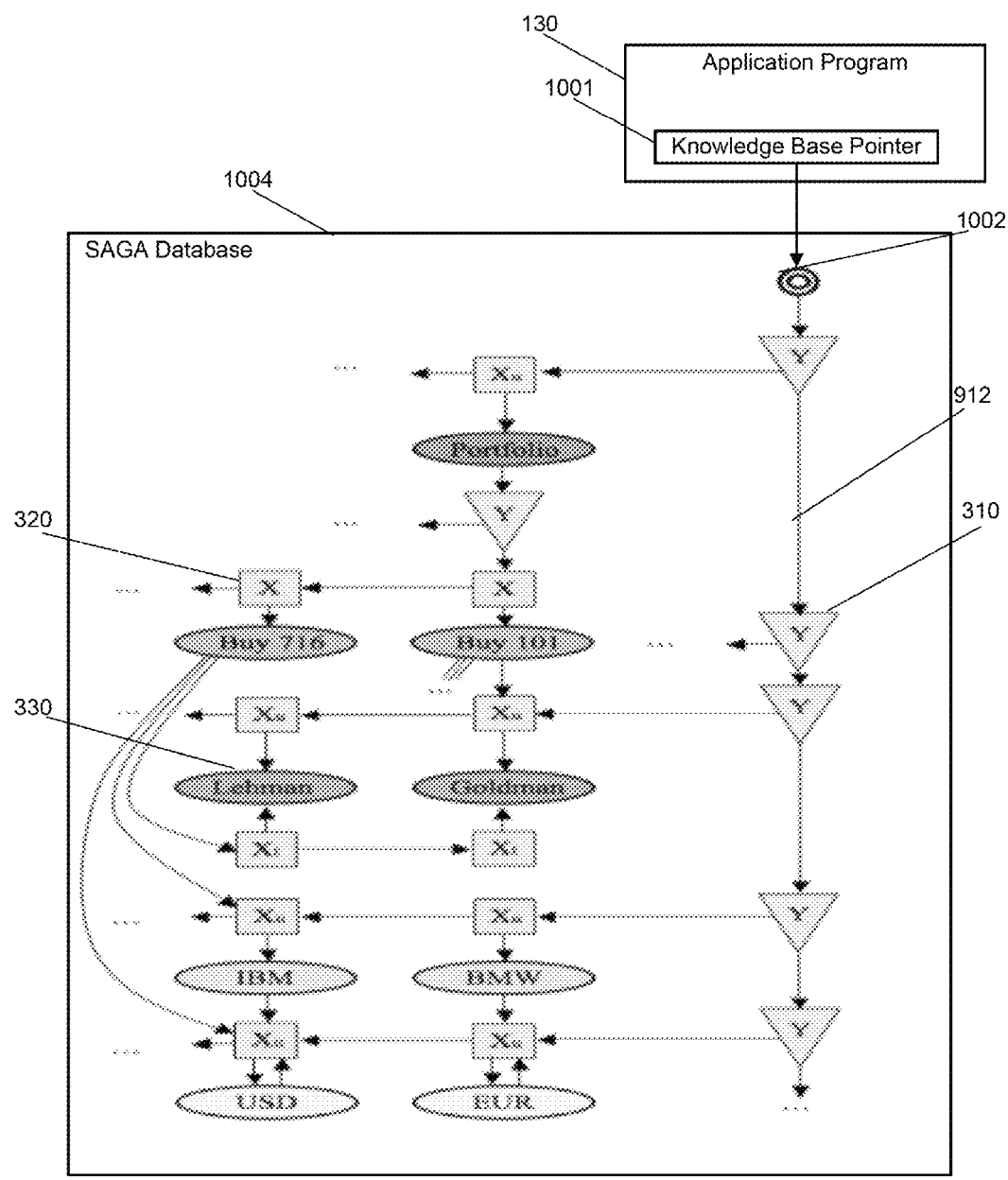
FIGS. 10a-b depict an exemplary structure for a SAGA database with a BIS attached.
Figure 10B:
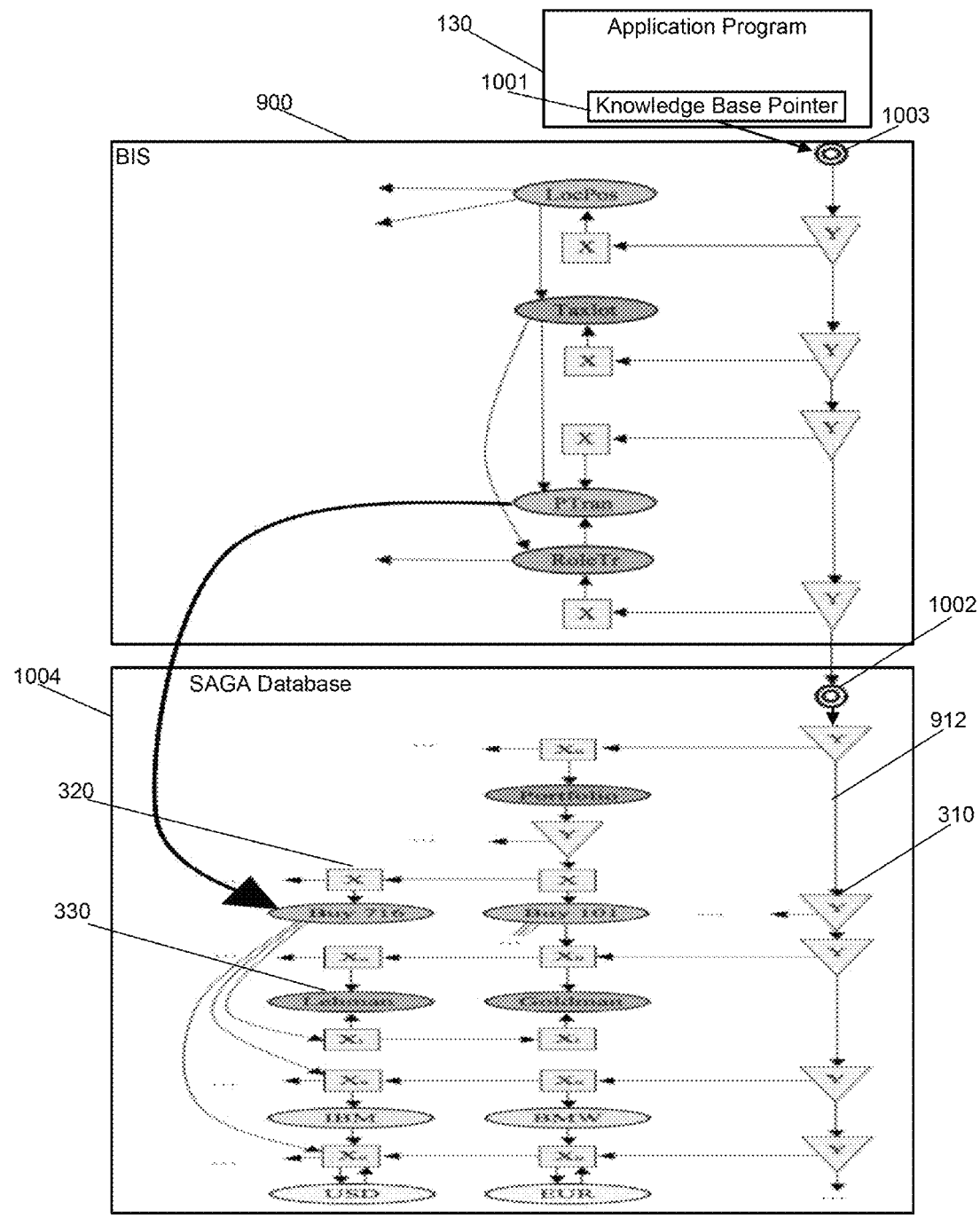
Figure 11:
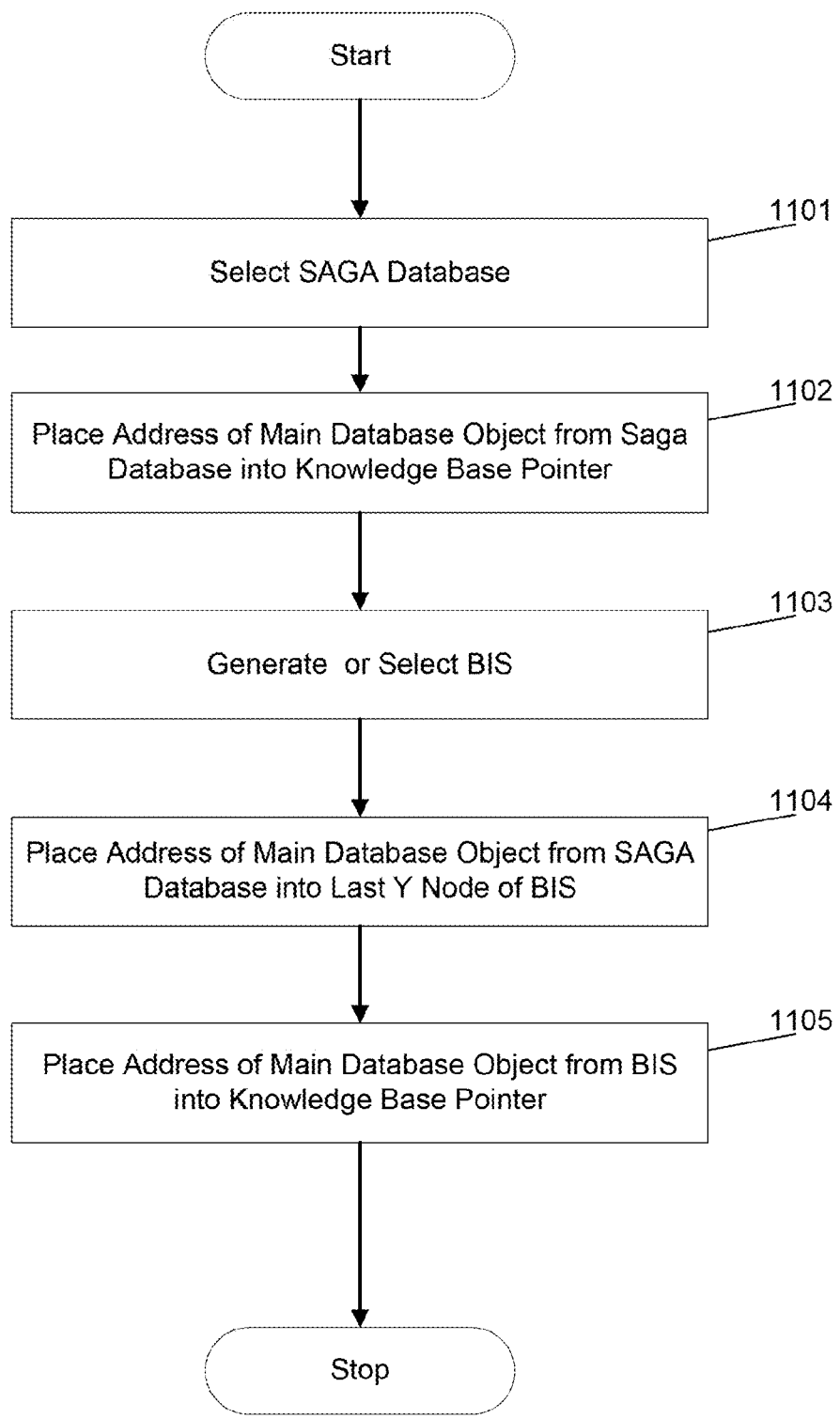
FIG. 11 depicts an exemplary procedure for attaching a BIS to a SAGA database.

Objects in the BIS 900 may also include pointers to objects in the SAGA database, or to objects in another BIS. The pointers from objects in the BIS 900 to objects in the SAGA database may be similar to the pointers between objects in the SAGA database, and the pointers may be maintained using memory mapped segment files similar to those use to store the SAGA database in the data repository 160, as described above. To create an Instantly Built Information Space, the BIS 900 may be attached to a database containing persistent objects, for example, the SAGA database. FIGS. 10a-b depict an exemplary structure for a SAGA database with a BIS attached. Triangles represent Y Nodes, such as Y Node 310. Squares represent X Nodes, such as X Node 320. Ellipses represent Z Nodes, such as Z Node 330, and arrows represent pointers, such as pointer 912. FIG. 11 depicts an exemplary procedure for attaching a BIS to a SAGA database.

In task 1101, a SAGA database may be selected. The selected SAGA database may reside in the data repository 160, and may be selected through the use of the application program 130. For example, as depicted in FIG. 10, a SAGA Database 1004 using the structure 300 has been selected.

In task 1102, the SAGA database 1004 may be loaded by placing the address of the main database object 1002 from the data repository 160 for the SAGA database 1004 into the knowledge base pointer 1001 of the application program 130, as depicted in FIG. 10a and similar to FIG. 3. The knowledge base pointer may reside in the application program 130, and may be used by the application program 130 to locate a database to work with. Operations using the SAGA database 1004 may proceed as described above in FIGS. 6-8, with regard to the mapping of segment files into memory as needed through the actions of the fault handler 150 and the computer hardware responsible for handling segmentation faults.

In task 1103, a BIS may be either selected or generated. For example, the BIS 900 may be generated by the application program 130 based on the objects in the data repository 160 for the SAGA database 1004. Or, the BIS 900 may have been previously generated and stored in segment files, and may be selected and loaded similar to a SAGA database.

In task 1104, the address of the main database object 1002 of the SAGA database 1004 may be placed in the last Y Node of the BIS 900, such that following the pointer from the last Y Node of the BIS 900 will lead to the start of the SAGA database 1004, as depicted in FIG. 10b.

In task 1105, the address of the main database object 1003 of the BIS 900 may be placed into the knowledge base pointer 1001 of the application program 130. The BIS 900 may now be considered attached to the SAGA database 1004, creating an Instantly Built Information Space, as depicted in FIG. 10b. Operations using the BIS 900 may proceed as described above for the SAGA database. The persistent data in the SAGA database 1004 and the quasi-persistent data in the BIS 900 may be searched and examined by the application program 130 in a seamless manner, as if they had always been part of the same database. Objects in the BIS 900 may be accessible in the same manner as objects in the SAGA database 1004, as the fault handler 150 and computer hardware for handling segmentation faults will treat objects from the BIS 900 in the same manner as objects from the SAGA database.

Objects in the BIS 900 may contain pointers to objects in the SAGA database 1004. These pointers may function in the same manner as pointers between objects in the SAGA database 1004. When the BIS 900 is attached to the SAGA database 1004, any pointers from objects in the BIS 900 to objects in the SAGA database 1004 are instantly reconnected, as the pointer addresses stored in the BIS 900 remain valid, as with pointers between objects in the SAGA database 1004 as describe above. Because the objects in the BIS 900 do not represent persistent data, there may be no links in objects in the SAGA database 1004 pointing to the objects in the BIS 900. The SAGA database 1004 may be unalterable when the BIS 900 is attached, as multiple BISs 900 may be attached to the same SAGA database 1004.

The procedure in FIG. 11 may be used to attach additional BISs 900 to the SAGA database 1004. For example, if a second BIS 900 were attached, the last Y node of the second BIS 900 may have the address of the main database object 1003 of the BIS 900 placed into it, and the knowledge base pointer 1001 may have the address of the main database object of the second BIS 900 placed into it.

To detach the BIS 900 from the SAGA database 1004, the address of the main database object 1002 of the SAGA database 1004 may be placed back into the knowledge base pointer 1001, overwriting the address of the main database object 1003 of the BIS 900. Because the SAGA database 1004 itself may contain no pointers to the BIS 900, once the pointer to the BIS 900 has been removed from the knowledge base pointer 1001 there may be no remaining pointers to the BIS 900, thereby detaching the BIS 900 from the SAGA database 1004. The application program 130 may then only be able to access the SAGA database 1004 until the BIS 900 or another BIS 900 is attached to form another IBIS.

The BIS 900 may be stored as a snapshot in memory-mapped segment files, similar to the memory mapped segment files used to store the segment files for the data repository 160, as depicted in FIG. 5. The segment files may be stored in, for example, the data repository 160. The files used to store the BIS 900 may use a different naming convention than that used for SAGA database files, described above. The file name and directory path format for segment files for the BIS 900 may be:

$GVHOME/kb/trxnlog/snapshot/snapshot.<aga key>/snapshot.(hash—2)/snapshot.(hash—4).snapshot.(hash).[s,p,d].(portfolio name).periodenddate.(memory address).(file number).

(hash—2) may represent a hash performed on the first two letters of the portfolio name, (hash—4) may represent a hash performed on the first four letters of the portfolio name, and (hash) may represent a hash performed on the entire portfolio name. The letters twr, s, d, or p may be chosen to represent whether the BIS 900 is a Time Weighted Return, summary, detailed, or period start BIS. For example, the filename and directory path for a segment file for the BIS 900 may be:

$GVHOME/kb/trxnlog/snapshot/snapshot.1620/snapshot.77/snapshot.770c/snapshot.770 c92.ca.s.jimsfund.20050105235959.2300000000.0

The BIS 900 may be used by multiple processes simultaneously. Some of these processes may modify the objects in the BIS 900, for example, through additions, deletions, or other changes. In order to allow a process to make changes to the BIS 900 while not interfering with other processes using the BIS 900, an operating system enforced private memory mapping may be used, such as, for example, the Portable Operating System Interface for Unix (POSIX) map_private option.

Figure 12:
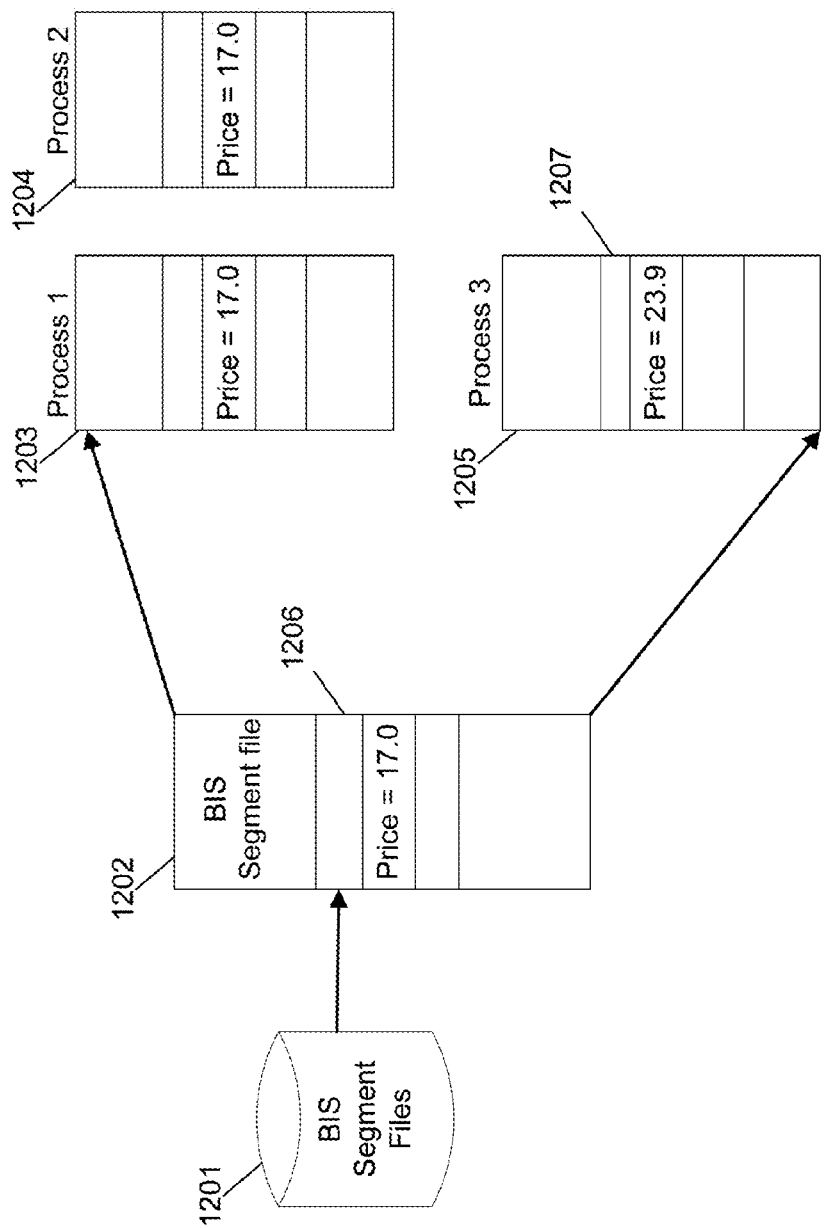
FIG. 12 depicts an exemplary structure for memory protection of data in BIS segment files.

FIG. 12 depicts an exemplary structure for memory protection of data in BIS segment files. The BIS 900 may be stored in BIS segment files 1201. A BIS segment file 1202 from the BIS segment files 1201 may be mapped into memory for use by three processes, process 1 1203, process 2 1204, and process 3 1205, as part of an IBIS. The BIS segment file 1202 may include memory page 1206 containing an object Price with a value of 17.0. The process 1 1203 and the process 2 1204 may use a copy of the BIS segment file 1202 that has been mapped into the operating system's kernel space. The process 3 1205 may alter the object Price from the BIS segment file 1202, changing the value from 17.0 to 23.9. Because the data in the BIS 900 is protected by the enforced private mapping, the primary copy of the BIS segment file 1202 resides in kernel space, which cannot be modified by user programs. Instead, a local copy of the memory page 1206 from the BIS segment file 1202 with the object Price is created, local memory page 1207. The process 3 1205 may modify the value of the object in the local memory page 1207. Whenever process 3 1205 wishes to access the memory page 1206, the operating system will direct the process 3 1205 to the local memory page 1207. The process 1 1203 and process 2 1204 may maintain access to the memory page 1206, and therefore not be affected by the changes to the object Price that are recorded on the local memory page 1207.

Multiple processes may be able to access the same BIS, and the use of operating system enforced private mapping may insulate each process from any changes to the BIS data made by other processes, while not requiring that each process have an entire separate copy of the BIS to operate on.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for receiving, storing and/or processing data for standalone application and/or over a networked medium or media.

Computers and computer systems described herein may include operatively associated computer-readable memory media such as memory for storing software applications and instructions used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, DVD, compact disc, memory stick, ROM (read only memory), RAM (random access memory), PROM (programmable ROM), EEPROM (extended erasable PROM), and/or other like computer-readable media.

In general, computer-readable memory media may include any memory medium capable of being a memory for electronic data representative of data or computer instructions stored, communicated or processed in accordance with embodiments of the present invention. Where applicable, method steps described herein may be embodied or executed as computer instructions stored on a computer-readable memory medium or media.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the present invention, a single component may be replaced by multiple components, and multiple components may be replaced by a single component, to provide an element or structure or to perform a given function or functions. Except where such substitution would not be operative to practice certain embodiments of the present invention, such substitution is considered within the scope of the present invention.

The examples presented herein are intended to illustrate potential and specific implementations of the present invention. It can be appreciated that the examples are intended primarily for purposes of illustration of the invention for those skilled in the art. The diagrams depicted herein are provided by way of example. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the following claims.

What is claimed is:

1. A programmable computer system for generating an Instantly Built Information Space (IBIS) for use with an application program, the application program associated with an operating system, the computer system comprising:
    means for connecting the application program to a data repository for a first database, the data repository including a plurality of memory-mapped segment files stored on at least one nonvolatile memory medium, wherein data in the data repository is not copied into main memory of the computer system from the data repository when needed by the application program;
    means for connecting the application program to a Bookkeeping Information Space (BIS);
    means for placing an address of a main database object of the BIS into a knowledge base pointer;
    means for placing an address of a main database object of the first database into a pointer in an object of the BIS;
    means for registering a fault handler with the operating system, the fault handler associated with the first database and the BIS;
    means for catching, by the fault handler, a segmentation fault issued for an object referenced by the application program and resident in the first database or the BIS, the segmentation fault issued at an interrupt location in the application program;
    means for finding a one of the plurality of segment files of the first database or the BIS that corresponds to the object referenced by the application program;
    means for mapping the found segment file into the main memory of the computer system;
    means for restarting the application program at the interrupt location;
    wherein the IBIS comprises the first database and the BIS;
    means for the application program to access the BIS through the knowledge base pointer and the first database through the pointer in the object of the BIS; and
    wherein the BIS comprises a second database containing only one variant of each of a plurality of objects from the first database.

2. The programmable computer system of claim 1, wherein the plurality of memory-mapped segment files include at least one portfolio segment and at least one price segment.

3. The programmable computer system of claim 1, further comprising:
    means for detecting a change to an object in the BIS, wherein the change comprises one of an addition, deletion, or modification of the object;
    means for determining an original page in a segment file of the BIS with the object subject to the change;
    means for determining a process responsible for the change;
    means for creating a local memory mapped copy of the original page in the segment file of the BIS with the object subject to the change;
    means for applying the change to the object on the local memory mapped copy of the original page in the segment file, wherein the object in the original page in the segment file is not changed;
    means for restricting the process responsible for the change from accessing the original page in the segment file by redirecting the process to the local memory mapped copy of the original page.

4. The programmable computer system of claim 1, further comprising:
    means for connecting to a second BIS;
    means for placing an address of a main database object of the second BIS into the knowledge base pointer; and
    means for placing the address of the main database object of the BIS into a pointer in an object of the second BIS.

5. The programmable computer system of claim 1, wherein the BIS comprises quasi-persistent objects.

6. The programmable computer system of claim 1 wherein objects in the BIS are directly interconnected by memory pointers.

7. The programmable computer system of claim 1, wherein the objects in the BIS are directly connected to the objects in the first database by memory pointers from the BIS to the first database.

8. The programmable computer system of claim 1, wherein each object includes a virtual function pointer, the virtual function pointer pointing to a shared memory area of the computer system holding virtual function tables associated with object types.

9. The programmable computer system of claim 1, further comprising means for the application program to directly access the data in the first database and the BIS without copying the data into the main memory of the computer system.

10. The programmable computer system of claim 1, wherein the application program is a portfolio management application, and the first database is a portfolio management database.

11. The programmable computer system of claim 1, wherein the first database is a Segmented Advent Global Area (SAGA) database.

12. A method for using a computer system to generate an Instantly Built Information Space (IBIS) for use with an application program, the application program associated with an operating system, the method comprising:
- connecting the application program, on the computer system, to a data repository for a first database, the data repository including a plurality of memory-mapped segment files stored on at least one nonvolatile memory medium, wherein data in the data repository is not copied into main memory of the computer system from the data repository when needed by the application program;
- connecting the application program, on the computer system, to a Bookkeeping Information Space (BIS);
- placing, on the computer system, the address of a main database object of the BIS into a knowledge base pointer;
- placing, on the computer system, the address of a main database object of the first database into a pointer in an object of the BIS;
- registering, using the computer system, a fault handler with the operating system, the fault handler associated with the first database and the BIS;
- catching, using the computer system, by the fault handler, a segmentation fault issued for an object referenced by the application program and resident in the first database or the BIS, the segmentation fault issued at an interrupt location in the application program;
- finding, using the computer system, one of the plurality of memory-mapped segment files of the first database or the BIS that corresponds to the object referenced by the application program;
- mapping, using the computer system, the found memory-mapped segment file into the main memory of the computer system;
- restarting, using the computer system, the application program at the interrupt location;
- wherein the IBIS comprises the first database and the BIS;
- accessing by the application program, on the computer system, the BIS through the knowledge base pointer and the first database through the pointer in the object of the BIS; and
- wherein the BIS comprises a second database containing only one variant of each of a plurality of objects from the first database.

13. The method of claim 12, further comprising:
- detecting, using the computer system, a change to an object in the BIS, wherein the change comprises one of an addition, deletion, or modification of the object;
- determining, using the computer system, an original page in a segment file of the BIS with the object subject to the change;
- determining, using the computer system, a process responsible for the change;
- creating, using the computer system, a local memory mapped copy of the original page in the segment file of the BIS with the object subject to the change;
- applying, using the computer system, the change to the object on the local memory mapped copy of the original page in the segment file, wherein the object in the original page in the segment file is not changed;
- restricting, using the computer system, the process responsible for the change from accessing the original page in the segment file by redirecting the process to the local memory mapped copy of the original page.

14. The method of claim 12, further comprising:
- connecting, using the computer system, to a second BIS;
- placing, using the computer system, an address of a main database object of the second BIS into the knowledge base pointer; and
- placing, using the computer system, the address of the main database object of the BIS into a pointer in an object of the second BIS.

15. The method of claim 12, wherein the BIS comprises quasi-persistent objects.

16. The method of claim 12, wherein the application program is a portfolio management application, and the first database is a portfolio management database.

17. The method of claim 12, wherein the first database is a Segmented Advent Global Area (SAGA) database.

18. A programmable computer system for generating an Instantly Built Information Space (IBIS) for use with an application program, the application program associated with an operating system, the computer system comprising:
- means for connecting to a data repository for a first database, the data repository including a plurality of memory-mapped segment files stored on at least one nonvolatile memory medium, wherein data in the data repository is not copied into main memory of the computer system from the data repository when needed by the application program;
- means for connecting to a Bookkeeping Information Space (BIS);
- means for placing an address of a main database object of the BIS into a knowledge base pointer such that the knowledge base pointer points to the BIS when accessed by the application program;
- means for placing an address of a main database object of the first database into a pointer in an object of the BIS such that the object of the BIS points to the first database when accessed by the application program;
- means for registering a fault handler with the operating system, the fault handler associated with the first database and the BIS;
- means for catching, by the fault handler, a segmentation fault issued for an object referenced by the application program and resident in the first database or the BIS, the segmentation fault issued at an interrupt location in the application program;
- means for finding one of the plurality of memory-mapped segment files of the first database or the BIS that corresponds to the object referenced by the application program;
- means for mapping the found segment file into the main memory of the computer system;
- means for restarting the application program at the interrupt location,
- wherein the IBIS comprises the first database and the BIS;
- wherein the application program accesses the BIS through the knowledge base pointer and the first database through the pointer in the object of the BIS; and
- wherein the BIS comprises a second database containing only one variant of each of a plurality of objects from the first database.

19. A non-transitory computer-readable memory medium including computer executable instructions for programming a computer system to generate an Instantly Built Information Space (IBIS) for use with an application program, the application program associated with an operating system, the non-transitory computer-readable memory medium comprising:

means for connecting the application program to a data repository for a first database, the data repository including a plurality of memory-mapped segment files stored on at least one nonvolatile memory medium, wherein data in the data repository is not copied into main memory of the computer system from the data repository when needed by the application program;

means for connecting the application program to a Bookkeeping Information Space (BIS);

means for placing an address of a main database object of the BIS into a knowledge base pointer;

means for placing an address of a main database object of the database into a pointer in an object of the BIS;

means for registering a fault handler with the operating system, the fault handler associated with the first database and the BIS;

means for catching, by the fault handler, a segmentation fault issued for an object referenced by the application program and resident in the first database or the BIS, the segmentation fault issued at an interrupt location in the application program;

means for finding one of the plurality of memory-mapped segment files of the first database or the BIS that corresponds to the object referenced by the application program;

means for mapping the found segment file into the main memory of the computer system;

means for restarting the application program at the interrupt location;

wherein the IBIS comprises the database and the BIS;

means for the application program to access the BIS through the knowledge base pointer and the database through the pointer in the object of the BIS; and wherein the BIS comprises a second database containing only one variant of each of a plurality of objects from the first database.

* * * * *

UNITED STATES PATENT AND TRADEMARK OFFICE
CERTIFICATE OF CORRECTION

| | | |
|---|---|---|
| PATENT NO. | : 8,458,217 B1 | Page 1 of 1 |
| APPLICATION NO. | : 12/546205 | |
| DATED | : June 4, 2013 | |
| INVENTOR(S) | : McGrogan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 486 days.

Signed and Sealed this
Twelfth Day of April, 2016

Michelle K. Lee
*Director of the United States Patent and Trademark Office*